(12) United States Patent
Furuki et al.

(10) Patent No.: US 7,307,787 B2
(45) Date of Patent: Dec. 11, 2007

(54) BEAM SPLITTING PRISM, METHOD OF MANUFACTURING BEAM SPLITTING PRISM, AND ALL-OPTICAL SWITCHING DEVICE

(75) Inventors: Makoto Furuki, Ashigarakami-gun (JP); Yasuhiro Sato, Ashigarakami-gun (JP); Izumi Iwasa, Ashigarakami-gun (JP); Satoshi Tatsuura, Ashigarakami-gun (JP); Minquan Tian, Ashigarakami-gun (JP); Hiroyuki Mitsu, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 683 days.

(21) Appl. No.: 10/739,210

(22) Filed: Dec. 19, 2003

(65) Prior Publication Data

US 2004/0156134 A1 Aug. 12, 2004

(30) Foreign Application Priority Data

Dec. 20, 2002 (JP) .............................. 2002-370130

(51) Int. Cl.
*G02B 27/10* (2006.01)
*G02B 27/14* (2006.01)
(52) U.S. Cl. ...................... 359/618; 359/629; 359/634; 359/636

(58) Field of Classification Search ................ 359/618, 359/629, 634, 636, 638, 639, 640, 831, 833, 359/834, 835, 836
See application file for complete search history.

(56) References Cited

FOREIGN PATENT DOCUMENTS

| JP | A 11-15031 | 1/1999 |
|---|---|---|
| JP | A 2002-62558 | 2/2002 |
| JP | A 2002-328005 | 11/2002 |
| JP | A 2003-149693 | 5/2003 |

*Primary Examiner*—Ricky Mack
*Assistant Examiner*—Brandi Thomas
(74) *Attorney, Agent, or Firm*—Oliff & Berridge, PLC

(57) ABSTRACT

In order to obtain a beam splitting prism which a beam can be split with simpler configuration in a state in which an optical path length is precisely controlled, there is provided a beam splitting prism having an incident and an outgoing faces orthogonal or parallel to each other, wherein transparent mediums, at least one beam splitter, and at least one reflector are combined so that the beam splitter and the reflector are located between the transparent mediums, the beam splitter and the reflector are arranged whose normal directions are orthogonal to each other, whereby a beam incident from an incident end face is outputted from an outgoing end face in the form of a plurality of split output beams.

10 Claims, 17 Drawing Sheets

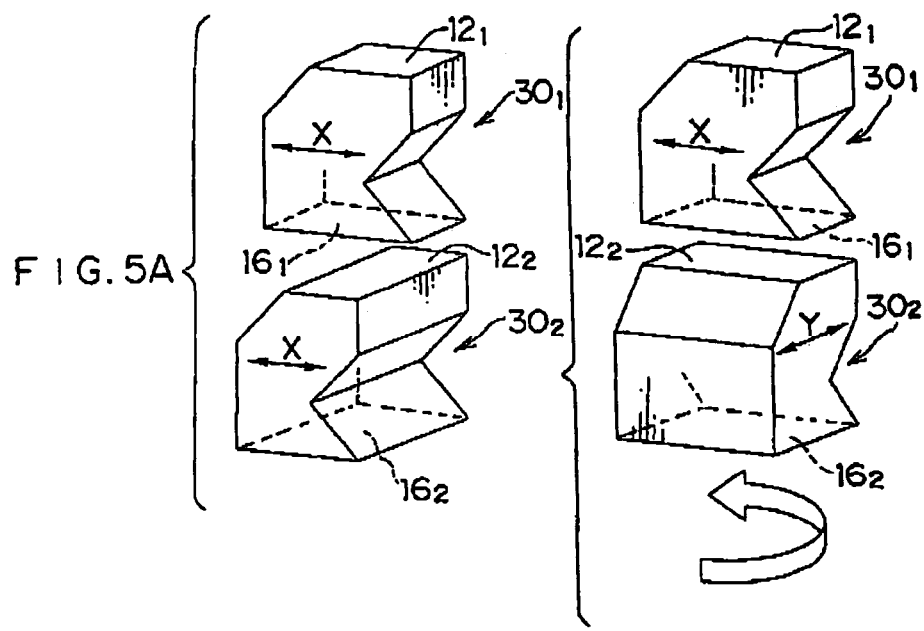
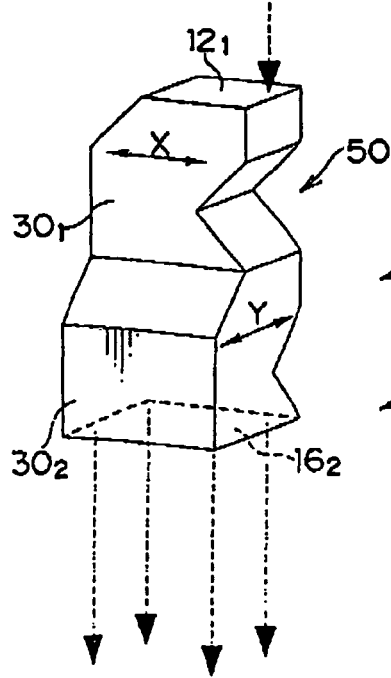
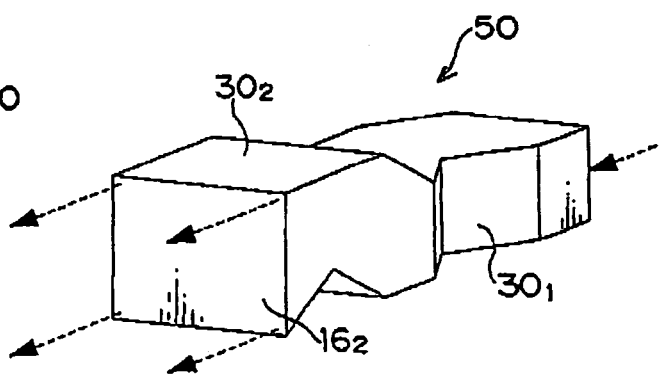

F I G. 10
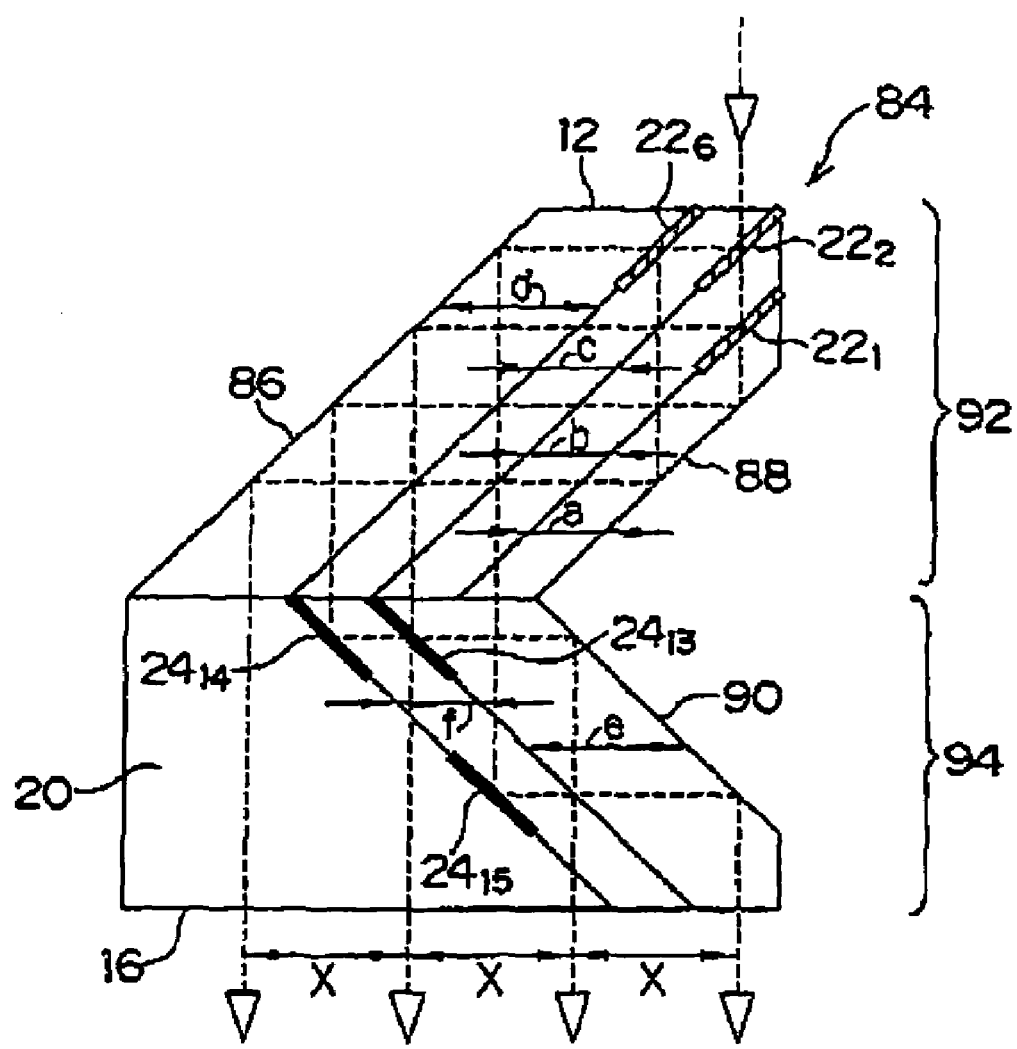

F I G . 17A
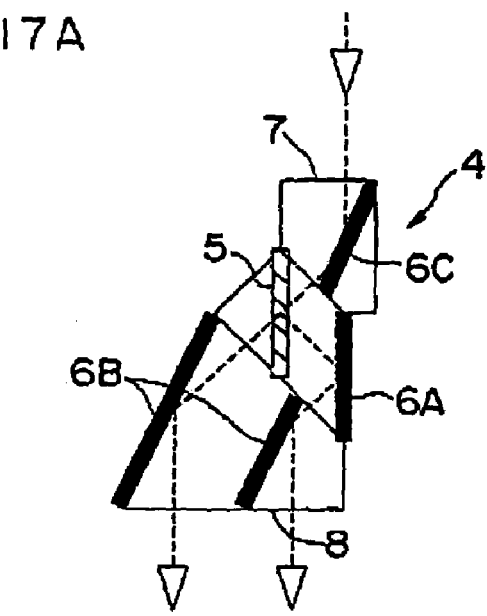
F I G . 17B
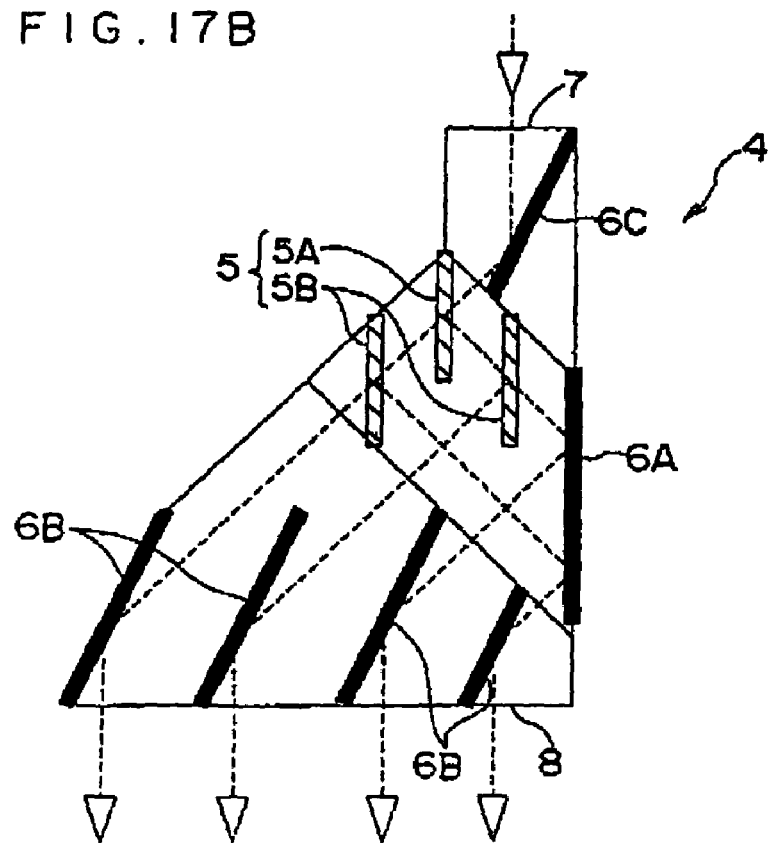

BEAM SPLITTING PRISM, METHOD OF MANUFACTURING BEAM SPLITTING PRISM, AND ALL-OPTICAL SWITCHING DEVICE

CROSS-REFERENCE TO RELATED APPLICATION

This application claims priority under 35USC 119 from Japanese Patent Application No. 2002-370130, the disclosure of which is incorporated by reference herein.

BACKGROUND OF THE INVENTION

1. Field of the Invention

The present invention relates to a beam splitting prism, a method of manufacturing the beam splitting prism, and an all-optical switching device, particularly to the all-optical switching device applicable to DEMUX (Demultiplexer) which extracts a specific time component in a time-division multiplexing signal, the beam splitting prism suitable for an optical component of the all-optical switching device, and the method of manufacturing the beam splitting prism.

2. Description of the Related Art

In recent years, the amount of information by communication is increased due to wide spread of information and communication network such as the Internet, and a high-capacity communication system which can transmit the huge amount of information at high speed is demanded. An optical communication system receives attention as the high-speed transmission technology from points of view of extremely short-pulse characteristics of light, broadband characteristics of an optical fiber used for the transmission, and capability of long-distance transmission. Particularly in a time division multiplexing mode of communication, DEMUX plays an important role in separating and extracting a specific time interval component from multiplexed signal pulses which are transmitted through the optical fiber.

In the optical communication system currently used an optical switch which is electrically controlled is used as an optical switching element extracting the specific time interval component from the signal pulses. However, when the high-capacity communication further proceeds in the future, for example an optical switch which optically turns on and off the signal light by an optical pulse is required in order to realize extremely high-speed communication not lower than tera-bit/s (Tbit/s) as unit corresponding to the increasing amount of information. For such an optical switch controlled by the light, the optical switch utilizing a nonlinear optical medium exhibiting a change in absorption or a change in refractive index caused by the irradiation of light is mainly researched.

The inventors have realized the element in which an extremely high-speed time-division multiplexing signal pulse in an order of Tbit/s is split (de-multiplexed) into signal pulses in a lump with an absorption change type two-dimensional optical switch (see Japanese Patent Application Laid-Open (JP-A) No. 11-15031). The lump change type optical switch will become the needed optical switch for a future system in which the extremely high-speed optical communication system (Tbit/s), which can be controlled by the light, is combined with a medium-speed optical communication system (up to 40 Gbit/s), which can be control by electricity. Further, the inventors have realized a Kerr effect type optical switch utilizing induced birefringence caused by the irradiation of the nonlinear optical medium with the light, and dramatically improved an on-off ratio in the optical switching (Japanese Patent Application Laid-Open (JP-A) No. 2002-062558).

Further, the inventors have realized the, optical switch stably operating irrespective of polarization state in such a manner that the optical switching is performed by separating the light beam into the polarized lights orthogonal to each other and optical components such as a beam splitting element and a lens array are configured by precisely forming and bonding the components at a surface orthogonal to a propagating direction of the light (Japanese Patent Application Laid-Open (JP-A) No. 2003-149693).

However, in the above-mentioned contact type optical switch, there is a problem that a configuration of the beam splitting prism used as the optical component is complicated and it is difficult to secure spatial and temporal superimposition in condensing spots of a conrtol pulse and a signal pulse during condensing the light beams at multiple points.

FIGS. 17A and 17B show a configuration of the conventional beam splitting prism. In the beam splitting prism shown in FIG. 17A, a total reflection mirror 6C for adjusting an angle is arranged in the propagating direction of a parallel beam input from an incident end face 7 into an optical element 4, and the input parallel beam is reflected with the total reflection mirror 6C and split with a half mirror 5 into two beams which respectively form the same angle to the half mirror 5. In the propagating direction of one of the two split beams, a total reflection mirror 6A is provided while being parallel to the half mirror 5, and the other beam is made to be parallel to the beam in such a manner that the other beam is reflected with the total reflection mirror 6A.

In the propagating direction of each of the parallel beams, total reflection mirrors 6B are respectively arranged in parallel to each other at positions where optical path lengths of the parallel beams after being split with the half mirror 5 are equal to each other. After each of the parallel beams is reflected with the corresponding total reflection mirror 5B, each of the parallel beams is output from an outgoing end face 8 which is formed so as to be orthogonal to an optical axis of the parallel beam after the reflection. That is to say, while the total reflection mirror 6B causes the optical path lengths of parallel beams split with the half mirror 5 to be equal to each other, the total reflection mirror 6B has a function of adjusting an outgoing angle. Since each of the output beams has the same optical path length from the split at the half mirror 5 to the incidence to the total reflection mirror 6B, the two split beams propagate at the same time to a plane normal to the propagating direction.

Using three kinds of half mirrors 5 as shown in FIG. 17B, second step half mirrors 5B are respectively arranged in the propagating direction of each beam which has been split into two beams with a first (first step) half mirror 5A, and the beam which has been split into the two beams at the first step can be split into four beams by further splitting the beam into two beams at the second step.

As shown in FIGS. 17A and 17B, in these beam splitting prisms, the number of components to be bonded is large and the number of surfaces to be bonded in assembly is also large. There are at least three bonding surfaces for both the two-split prism and the four-split prism.

In almost all the components to be bonded, the incident end face is not parallel to or orthogonal to the outgoing end face, so that an outgoing direction is changed when a bonding angle is deviated. Further, the outgoing angle is changed when rotational deviation is generated in a bonding surface during bonding the components, and an outgoing position is shifted when a bonding position is deviated. As a result, it is difficult to maintain parallelism and positional accuracy of the split beams. That is to say, in the optical component in which the incident end face is not parallel to or orthogonal to the outgoing end face like the prism, it is not easy to polish the optical component with high accuracy, and it is difficult to secure the accuracy in the outgoing direction when the multiple optical components are bonded to one another.

Further, in the two-split prism shown in FIG. 17A, any split beam does not have coaxial relation with the incident light beam, and it is impossible to insert the prism in an aligned optical system.

Similarly to Japanese Patent Application Laid-Open (JP-A) No. 2002-328005, in the case where the prism which splits the incident beam and outputs the split beams from a plurality of positions is formed to obtain the plurality of split beams propagating through the predetermined optical path lengths within the prism in such a manner that the transparent mediums are laminated in one direction and the splitting optical element or the reflecting surface is formed in the bonded surfaces of the laminated transparent mediums, there is a problem that the beams can be outputted only at the outgoing positions of respective split beams on the outgoing end face, the outgoing positions having, in one direction parallel to the outgoing end face, an interval equal to a difference of optical path lengths.

In this case, in a case in which, as the splitting optical system, another optical element is inserted in the optical path in order to adjust the outgoing position, changing of the outgoing position caused by changing of positions of the prism and the optical element due to temperature variation. As a result, it is difficult to use stably as the splitting optical system.

SUMMARY OF THE INVENTION

In view of the foregoing, it is an object of the present invention to provide a beam splitting prism which can split the beam with the simpler configuration in a state in which the accuracy of the outgoing position and the parallelism are high and the optical path length is precisely controlled, and outgoing positions of outgoing beams which are split can be set freely, and a method of manufacturing the beam splitting prism.

It is another object of the invention to provide an all-optical switching device which can secure the spatial and temporal superimposition in the condensing spots of the conrtol pulse and signal pulse during condensing the light beams at multiple points.

In order to achieve the above-mentioned objects, a beam splitting prism of the invention having an incident end face and an outgoing end face being orthogonal to or parallel to each other, the beam splitting prism comprising a plurality of transparent mediums combined to be bonded such that a plurality of bonded surfaces are tilted at 45° relative to a propagating direction of a beam propagating inside the beam splitting prism, and including at least two pairs of bonded surfaces whose normal directions are orthogonal to each other, a beam splitting optical element positioned at least between one pair of the two pairs of bonded surfaces, and including a splitting surface splitting an incident beam into a transmission beam and a reflection beam reflecting a part of the incident beam at 90°, and a reflecting optical element positioned at least between another pair of the two pairs of bonded surfaces whose normal direction is orthogonal to that of the bonded surfaces in which the beam splitting optical element exists, and including a reflecting surface which reflects at least a part of the beam split by the beam splitting optical element at 90°, whereby a beam incident from the incident end face is outputted from the outgoing end face in the form of a plurality of split output beams.

In the beam splitting prism of the invention, the incident end face and the outgoing end face being orthogonal to or parallel to each other are provided. The plurality of transparent mediums are combined to be bonded such that the plurality of bonded surfaces which are tilted at 45° relative to the propagating direction of the beam propagating inside the beam splitting prism are formed. The beam splitting optical element and the reflecting optical element exist at the bonded surfaces. Due to this simple structure, the beam incident from the incident end face is converted into the plurality of split output beams, and they are outputted from the outgoing end face.

It is relatively easy that the plurality of transparent mediums are combined to be bonded and the plurality of bonded surfaces which are tilted at 45° relative to the propagating direction of the beam propagating inside the beam splitting prism are formed with high accuracy. Therefore, according to the beam splitting prism of the invention, the beam can be split in a state in which the accuracy of the outgoing position and the parallelism are high and the optical path length is precisely controlled.

Further, the plurality of bonded surfaces include at least two pairs of bonded surfaces whose normal directions are orthogonal to each other. By the structure in which the reflecting optical element is positioned between the bonded surfaces whose normal direction is orthogonal to that of the bonded surface between which the beam splitting optical element is positioned, by this reflecting optical element, the propagating direction of the beam after being split by the splitting optical element can be changed in the direction different from the reflecting direction of the beam reflected from the reflecting optical element positioned between bonded surfaces which are parallel to the bonded surf aces between which the beam splitting optical element is positioned. Therefore, in the outgoing end face, the plurality of split beams can be outputted toward not only one direction but also the plurality of directions. Further, the outgoing positions and the outgoing interval of the plurality of split beams can be set, which is not limited by the optical path length.

In the beam splitting prism of the present invention, it is possible that the plurality of split output beams have the same optical path length in the transparent mediums, or the plurality of split output beams have different optical path lengths in the transparent mediums.

In the conventional beam splitting prism in which the bonded surfaces of the transparent mediums are formed in one direction, since it is necessary to provide the optical path length difference corresponding to the interval of the outgoing positions of the split beams in order to cause the outgoing positions to be different from one another, in the case where reflective index of the prism is fluctuated by temperature, influences of the phases of the split beams differ from one another according to the optical path length of the split beam. However, in the invention, since the optical path length or the optical path length difference of each split beam within the prism is constant, a change in reflective index uniformly affects each split light beam. As a result, a fluctuation in phase of each split light beam becomes equal and characteristics among the split light beams are stabilized. Adjustment of the optical path length difference can be easily performed by adjusting the thickness or refractive index of the transparent medium.

Further, in the beam splitting prism of the present invention, it is preferable that the beam splitting prism having a structure in which the first block and the second block are provided, the first block having a structure in which a plurality of transparent mediums are laminated to be bonded such that a plurality of bonded surfaces are tilted at 45° relative to the propagating direction of the beam propagating inside the beam splitting prism, the beam splitting optical element and a first face forming a 45° angle relative to the bonded surface in which the beam splitting optical element exists, and the second block having a structure in which a plurality of transparent mediums are laminated to be bonded such that a plurality of bonded surfaces are tilted at 45° relative to the propagating direction of the beam propagating inside the beam splitting prism, the beam splitting optical element and a second face forming a 45° angle relative to the bonded surface whose normal direction is orthogonal to that of the bonded surface in which the beam splitting optical element exists, and the first face and the second face are bonded.

By the above-described configuration of the first and second blocks, when the split light beam split at the first block by the splitting optical element is incident to the second block, since the bonded surface between the first interface and the second interface becomes perpendicular to the propagating direction of the split beam, refraction of the split beam can be prevented at the bonded interface.

The beam splitting optical element and the reflecting optical element are arranged so as to be tilted at 45° relative to the beam incident to the splitting surface or the reflecting surface and the block including the reflecting surface tilted at 45° relative to the incident end face can be easily produced with high accuracy. The two blocks including the reflecting surface tilted at 45° relative to the incident end face can be accurately bonded without generating position shift or rotational shift in the bonded surface. In particular, the bonded surface between the blocks becomes only one, so that the rotational shift in the bonded surface is hardly generated. Accordingly, the beam can be split while outgoing position accuracy and parallelism are high and the optical path length is correctly controlled.

Further, it is preferable, in the beam splitting prism formed by the first and second blocks, that the first block includes a surface parallel to the first face, the surface being opposite to the first face, and the second block includes a surface parallel to the second face, the surface being opposite to the second face. In the optical blocks having the first face and the opposite surface parallel to the first face and the second face and the opposite surface parallel to the second face, relative relationship in the surface direction among the face, the opposite surface, and the bonded surf ace is correctly formed compared with other cases, so that the accuracy of the obtained beam splitting prism is improved.

In the beam splitting prism of the present invention, it is possible to have a structure in which the plurality of sets each comprising the first block and the second block, the sets being bonded, are include. As described above, by combining the plurality of beam splitting prisms in series each of the plurality of beams outgoing from the outgoing end face of the beam splitting prism located on the upstream side in the propagating direction is split by the beam splitting optical element of the next beam splitting prism located on the downstream side in the propagating direction. The plurality of split beams, in which the parallelism is high and time delay is correctly controlled, can be obtained by the very simple configuration described above.

It is preferable that, in a case in which the beam splitting prism is formed by the plurality of the sets, in each of the plurality of sets, the first block includes the surface parallel to the first face, the surface being opposite to the first face, and the second block includes the surface parallel to the second face, the surface being opposite to the second face, and in sets bonded each other among the plurality of sets, the surface opposite to the first face in one of the sets bonded each other and the surface opposite to the second face in another of the sets bonded each other are bonded to each other. By the above configuration, when the split beam propagating through each set is incident to other set, the propagating direction of the split beam becomes perpendicular to the surface, so that the refraction of the split light beam can be prevented at the bonded face.

In this case, it is further preferable to have a structure in which, in the sets bonded each other among the plurality of sets, a direction of the bonded surface in the set located on a downstream side in the propagating direction of the propagating beam is configured to be parallel to a surface which is obtained by the bonded surface in the set located on an upstream side being rotated by 90° about an axis whose direction is perpendicular to the surface of the set on the upstream side and the set on the downstream side. The split beam in which a split ratio of each set is multiplied can be easily outputted in the form of a two-dimensional lattice by the above configuration. It is not always necessary to split the light beam into all cells in the two-dimensional lattice, and the split light beam can be outputted from the desired positions in the cells of the two-dimensional lattice according to the use of the beam splitting prism. Specifically there is an easy method in which a light-shielding body is properly arranged on the outgoing end face.

Further, in the present invention, it is preferable that the incident beam incident from the incident end face is coaxial with an optical axis of one split output beam in the plurality of split output beams outgoing from the outgoing end face. At least one beam can be inserted in the aligned optical system without shifting the beam in such a manner that the optical axis of the incident beam is caused to be coaxial with the optical axis of at least one split outgoing beam.

It is preferable to use, as the beam splitting optical element, a half mirror or a polarized beam splitter for the invention. More specifically, a mirror type beam splitter, in which a metal thin film or a dielectric multilayered film is provided on a substrate such as a glass plate and a part of the beams is transmitted while other part of the beams is reflected, can be used. The half mirror, in which the intensity of the transmitted light beam and the intensity of the reflected light beam are set to the predetermined ratio, or the polarization beam splitter which takes out the beams whose vibration directions of magnetic vectors are orthogonal to each other is preferably used for the mirror type polarization beam splitter. As long as the above lightwave splitting function is exerted, a diffraction grating or a holographic optical element can be also used.

At least the action reflecting the incident beam toward the direction of 90° is required in the reflecting optical element of the invention. In the case where only the reflecting action is required, it is preferable to use a total reflection mirror. It is also possible to use the configuration in which a part of the incident beams can be reflected and other part of the incident beams can be transmitted. Further, it is possible to use the configuration in which the predetermined polarized beam can be reflected toward the direction of 90° and the polarized beam orthogonal to the predetermined polarized beam can be transmitted. More specifically, a half mirror or a polarization beam splitter can be used. Those multifunctional reflecting optical elements can be formed by using, e.g. the metal thin film or the dielectric multilayered film.

In the invention, it is preferable that the transparent medium has the surface in which the total reflection is generated at the interface between the transparent medium and air. Although coating of the reflecting optical element material required in controlling the optical path has large optical loss and polarization dependence, in the total reflection obtained by inputting the light beam to the interface between, e.g. glass and air from the glass side with the light beam exceeding a critical angle, the polarization dependence is eliminated and the optical loss is little. Therefore, the optical loss and the polarization characteristics can be suppressed by utilizing the total reflection at the interface between air and the transparent medium such as the glass.

Further, in order to achieve the object mention above, a method of manufacturing a beam splitting prism having an incident end face and an outgoing end face being orthogonal to or parallel to each other, the beam splitting prism comprising a plurality of transparent mediums combined to be bonded such that a plurality of bonded surfaces are tilted at 45° relative to a propagating direction of a beam propagating inside the beam splitting prism, and including at least two pairs of bonded surfaces whose normal directions are orthogonal to each other, a beam splitting optical element positioned at least between one pair of the two pairs of bonded surfaces, and including a splitting surface splitting an incident beam into a transmission beam and a reflection beam reflecting a part of the incident beam at 90°, and a reflecting optical element positioned at least between another pair of the two pairs of bonded surfaces whose normal direction is orthogonal to that of the bonded surfaces in which the beam splitting optical element exists, and including a reflecting surface which reflects at least a part of the beam split by the beam splitting optical element at 90°, whereby a beam incident from the incident end face is outputted from the outgoing end face in the form of a plurality of split output beams, the method of manufacturing the beam splitting prism comprises the steps of: forming at least one beam splitting optical element to a predetermined position on a surface of a flat plate-shaped transparent medium; forming at least one reflecting optical element to a predetermined position on a surface of a flat plate-shaped transparent medium; forming a first laminated body including the bonded surface in which the beam splitting optical element exists by laminating a plurality of transparent mediums including a first transparent medium, at which at least beam splitting optical element is formed, and a second transparent medium such that a principal surface, at a side at which the beam splitting optical element is formed, of the first transparent medium and a principal surface of the second transparent medium are bonded; forming a second laminated body including the bonded surface in which the reflecting optical element exists by laminating a plurality of transparent mediums including a third transparent medium, at which at least reflecting optical element is formed, and a fourth transparent medium such that a principal surface, at a side at which the reflecting optical element is formed, of the third transparent medium and a principal surface of the fourth transparent medium are bonded; cutting a first block from the first laminated body so that a first cut surface, which forms an angle of 45° relative to the principal surface of the first transparent medium, is formed; cutting a second block from the second laminated body so that a second cut surface, which forms an angle of 45° relative to the principal surface of the second transparent medium, is formed; bonding the first cut surface of the first block and the second cut surface of the second block to each other.

In the method of manufacturing a beam splitting prism of the invention, the laminated body is formed by laminating and bonding the plurality of plate-shaped transparent mediums in the laminated body forming step, it is easy to confirm the parallelism of the plate-shaped transparent medium in the bonding and the thickness of the plate-shaped transparent medium can be relatively easily controlled. It is preferable that the number of laminated transparent mediums (the number of components) is decreased by devising positioning of the half mirror or the total reflection mirror.

Since the block is cut from the laminated body at a 0° or 45° angle to the principal plane of the transparent medium in the block cutting step, the block can be cut with high accuracy. It is preferable that, in the first block cutting step, the first block is further cut such that a cut surface parallel to the first cut surface is formed. Also, it is preferable that, in the second block cutting step, the second block is further cut such that a cut surface parallel to the second cut surface is formed. Further, it is preferable that the rectangular block is cut. Since the plurality of blocks which have been cut with high accuracy are bonded to one another in the block bonding step, the bonding can be performed with high accuracy without generating the positional deviation or the rotational deviation in the bonding surface.

Due to the above-mentioned advantages, according to the manufacturing method of the invention, it is easy to manufacture the beam splitting prism in which not only the outgoing position from the outgoing end face can be arbitrarily set, but also the beam can be split while the parallelism is high and the optical path length is correctly controlled.

In the process of cutting the first block or the second block, it is preferable that the first block is cut so that a part of the principal surface of the first transparent medium parallel to the splitting surface or a part of the principal surface of the second transparent medium parallel to the splitting surface is not excised, and the second block is cut so that a part of the principal surface of the third transparent medium parallel to the reflecting surface or a part of the principal surface of the fourth transparent medium parallel to the reflecting surface is not excised. The surface which has not been removed is originally the principal surface of the flat plate, and the surface has high flatness. The step of forming the reflecting surface can be omitted by utilizing the surface which has not been cut for the reflecting surface.

It is preferable that the plurality of first blocks and the plurality of second blocks are formed, and the plurality of the first blocks and the second blocks are bonded at the cut surfaces thereof in the block bonding step. The beam splitting prism which has the high accuracy and the large number of the divergences can be easily manufactured in the above way.

The beam splitting prism which outputs the two-dimensional lattice shaped split output light beam can be easily manufactured in such a manner that, in the block bonding step, the principal surface of the first transparent medium in the first block which is bonded on a downstream side in the propagating direction of the beam from the second block is bonded so as to be parallel to a surface which is obtained by the principal surface of the third transparent medium of the second block being rotated by 90° about an axis in a direction perpendicular to the surface.

In order to achieve the object mention above, a first all-optical switching device of the present invention comprises an optical switch in which a region of on-state is formed only in an irradiated portion during irradiating the irradiated portion with a control pulse, the optical switch spatially switching an optical path of a signal pulse by transmitting or reflecting the incident signal pulse in the region of on-state; a signal beam irradiating section which irradiates the optical switch with a plurality of parallel beams as the signal pulses, the plurality of parallel beams having the same optical path length; and a control beam irradiating section which irradiates the optical switch with a plurality of parallel beams as the control pulses, the plurality of parallel beams having different optical path lengths, wherein at least one of the signal beam irradiating section and the control beam irradiating section comprises a beam splitting prism of the present invention.

In order to achieve the object mention above, a second all-optical switching device of the present invention comprises an optical switch in which a region of on-state is formed only in an irradiated portion during irradiating the irradiated portion with a control pulse, the optical switch spatially switching an optical path of a signal pulse by transmitting or reflecting the incident signal pulse in the region of on-state; a signal beam irradiating section which irradiates the optical switch with a plurality of parallel beams as the signal pulses, the plurality of parallel beams having different optical path lengths; and a control beam irradiating section which irradiates the optical switch with a plurality of parallel beams as the control pulses, the plurality of parallel beams having the same optical path length, wherein at least one of the signal beam irradiating section and the control beam irradiating section comprises the beam splitting prism of the present invention.

In the first and second all-optical switching devices of the invention, the beam splitting prism of the invention is used for at least one of the signal beam irradiating section which irradiates the optical switch with the signal pulse and the control beam irradiating section which irradiates the optical switch with the control pulse, so that the plurality of split light beams, in which the parallelism is high and time delay is correctly controlled, can be obtained by the very simple configuration. Further, the intensities of the split light beams are substantially uniform. Accordingly, spatial and time overlap can be secured at the focusing spots of the conrtol pulse and the signal pulse during the multipoint focusing, and the all-optical switching device can be driven with high accuracy.

The all-optical switching device of the invention can be applied to a DENUX apparatus which takes out a specific time component in a time-division multiplex signal by equalizing the predetermined optical path length to the pulse interval of the signal pulse.

BRIEF DESCRIPTION OF THE DRAWINGS

FIGS. 5A to 5D are views explaining the process of manufacturing a combined beam splitting prism according to a third embodiment.

FIG. 10 is a side view showing the configuration of a modification of the beam splitting prism shown in FIG. 8.

FIGS. 17A and 17B are side views showing the configuration of the conventional beam splitting prism.

DETAILED DESCRIPTION OF THE INVENTION

Referring to the accompanying drawings, preferred embodiments of the present invention will be described in detail below.

First Embodiment

Figure 1:
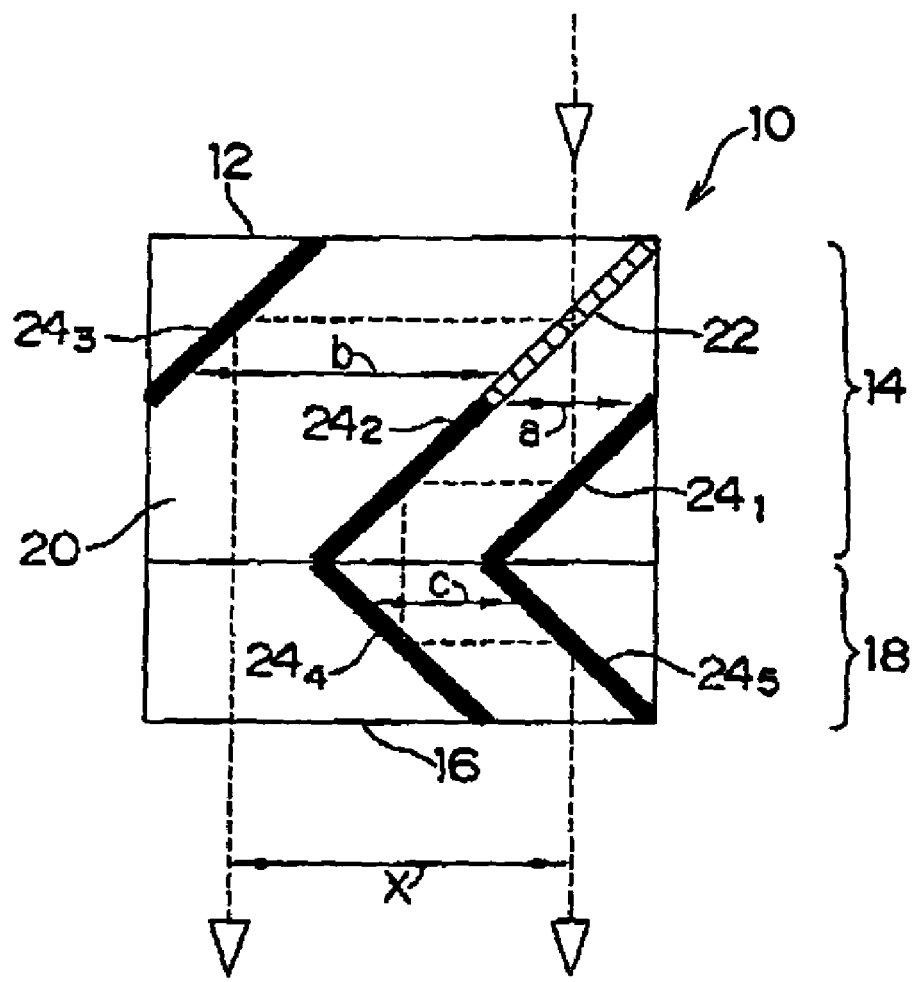
FIG. 1 is a side view showing a configuration of a beam splitting prism according to a first embodiment.

The configuration of the beam splitting prism according to a first embodiment will be described. As shown in FIG. 1, a beam splitting prism 10 includes a first block 14 which is provided with an incident end face 12 and a second block 18 which is provided with an outgoing end face 16 and bonded to the first block 14 so that the outgoing end face 16 is parallel to the incident end face 12. The first block 14 and the second block 18 are configured in the form of a rectangular parallelopiped shape by laminating a plurality of plate-shaped transparent mediums 20 respectively.

A half mirror 22 and a total reflection mirror 24 are properly and respectively provided between the laminated transparent mediums 20 so as to make a 45° angle to the incident end face 12 of the beam splitting prism 10. In the embodiment, while the half mirror 22 and three total reflection mirrors 24$_1$ to 24$_3$ are respectively provided between the transparent mediums 20 of the first block 14, two total reflection mirrors 24$_4$ and 24$_5$ are respectively provided between the transparent mediums 20 of the second block 18. The total reflection mirrors 24$_1$ and 24$_5$ and the total reflection mirrors 24$_2$ and 24$_4$ are provided in symmetrical relation to a bonding surface between the first block 14 and the second block 18 respectively.

However, the method of manufacturing the beam splitting prism 10 is described later, the half mirror and the total reflection mirror are formed by partially coating a material of the half mirror and total reflection mirror onto the surfaces of the plate-shaped transparent medium 20.

In the beam splitting prism 10, the half mirror 22 is arranged in the propagating direction of the parallel beam input into the prism from the incident end fade 12, and the input parallel beam is split with the half mirror 22 into two beams which respectively form the same angle to the half mirror 22.

In the propagating direction of the beam which has been reflected with the half mirror 22, the total reflection mirror $24_3$ is provided in parallel to the half mirror 22. The beam which has been reflected with the half mirror 22 is reflected with the total reflection mirror $24_3$ to become the beam parallel to the other beam which has been transmitted through the half mirror 22, and then the beam is output from the outgoing end face 16 which is formed so as to be orthogonal to the optical axis of the parallel beam after the reflection.

In the propagating direction of the beam which has been transmitted through the half mirror 22, while the total reflection mirrors $24_1$ and $24_2$ are provided being parallel to the half mirror 22, the total reflection mirrors $24_4$ and $24_5$ are provided so as to make a 90° angle to the half mirror 22, the beam which has been transmitted through the half mirror 22 is reflected with the total reflection mirrors $24_1$, $24_2$, $24_4$, and $24_5$ in order, and then the beam is output from the outgoing end face 16 which is formed so as to be orthogonal to the optical axis of the parallel beam after the reflection while the beam has coaxial relation with the incident light beam.

The total reflection mirrors $24_1$ to $24_5$ have functions of causing optical path lengths of the parallel beams split with the half mirror 22 to become the same and adjusting the outgoing angles of the parallel beams. Since each beam output from the outgoing end face 16 has the same optical path length from the split at the half mirror 22 to the output, each beam propagates at the same time to the plane normal to the propagating direction of the beam. That is to say, the first block 14 functions as a beam splitting section which splits the beam and the second block 18 functions as an optical path adjusting section which adjusts the outgoing position and the delay time.

As described above, according to the beam splitting prism of the embodiment, one incident beam can be split into the two parallel beams by the simple configuration including only the two blocks.

Since all of the half mirror and total reflection mirrors (including air interfaces) are respectively provided so as to make a 45° angle to the incident end face, each block can be made with high accuracy, and the blocks can be bonded with each other with high accuracy without generating the positional deviation or the rotational deviation in the bonding surface. Particularly, it is difficult to generate the rotational deviation in the bonding surface, because there is only one bonding surface between the blocks.

Since at least one beam is output in coaxial relation with the incident light beam, the alignment becomes easy to perform and the beam splitting prism can be placed into the optical path with high accuracy. That is to say, in the case where the beam splitting prism is inserted into the optical path of one beam whose optical path is previously adjusted, at least one beam can be securely output without the positional deviation. Even in the alignment of multiple points, the beam splitting prism of the embodiment has a merit of only adjusting the rotational deviation in a direction of a fixed axis (optical axis) of the beam splitting prism.

Further, durability against environmental change, vibration, and impact is improved by providing the half mirror and total reflection mirrors in the prism. That is to say, compared with a conventional plane-waveguide type element and a conventional technique utilizing a bundle of optical fibers, which have the similar function as the beam splitting prism of the embodiment, the beam splitting prism of the embodiment has small coupling loss, large resistance to disturbance, is easy in adjustment, and smaller chirp is caused by dispersion of the extremely short pulse in the transparent medium because of the basically shorter optical path length. An overall element size can be also decreased by the contact structure.

In order to secure time simultaneity between the two outgoing light beams, the condition that an optical path length b between the half mirror 22 and the total reflection mirror $24_3$ is equal to the sum a+c of an optical path length a between the total reflection mirror $24_1$ and the total reflection mirror $24_2$ and an optical path length c between the total reflection mirror $24_4$ and the total reflection mirror $24_5$ in the direction parallel to the incident end face 12 (horizontal direction) may be required.

Offering a further detailed explanation, since the optical path lengths in the vertical direction of the two split beams are the same, the optical path lengths of the two beams in the prism (transmitted distance) can be compared with each other by performing comparison only between the optical path lengths in the horizontal direction. The optical path length is a+c on the coaxial side of the incident light beam and the optical path length is b on the other side (not the coaxial side of the incident light beam), so that the following equation needs to hold in order that the two optical path lengths become the same.

$$a+c=b$$

Assuming that one beam has coaxial relation with the incident light beam and the other beam is output at a position where the other beam is shifted by X from the beam having coaxial relation with the incident light beam, the following relationship is derived. However, the positional deviation in some degree at the parallel direction of the optical path never results in the deviation in the optical path lengths, because the light is vertically incident to the incident end face and outgoing end face.

$$a=c, X=b$$

Using X, each of a, b, c can be expressed as follows:

$$a=c=X/2, b=X.$$

In the case where optical path length difference D is given to the two beams while the outgoing positions are held (maintained), for example it is necessary to satisfy the following relationship. In this case, the sum of the optical path length a and the optical path length c is longer than the optical path length b by the optical path length difference D, and the beam having coaxial relation with the incident light beam is delayed.

$$a+c=b+D, a=c, b=X$$

Using X and D, each of a, b, c can be expressed as follows:

$$a=c=(X+D)/2, b=X.$$

As can be seen from those equations, by changing a thickness of a part (transparent medium) giving the optical path length a and the optical path length c, not only the optical path lengths can become the same while the outgoing positions are held, but also the optical path length difference can be optionally added. The optical path length difference D may be either a positive value or a negative value. However, the optical path length difference which can be added is limited by the distance X between the outgoing light beams or the overall size of the prism.

Referring to FIGS. 2A to 2D, a method of manufacturing the above-mentioned beam splitting prism will be described below. The beam splitting prism shown in FIG. 1 can be easily made by cutting the laminated parallel plates.

Figure 2A:
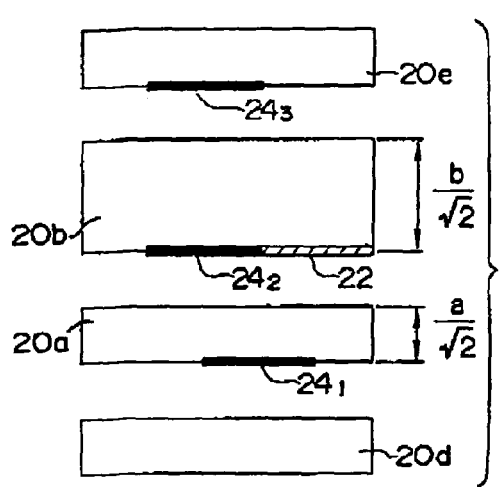
FIGS. 2A to 2D are views explaining a process of manufacturing the beam splitting prism according to the first embodiment.

Four parallel plates 20a, 20b, 20d, and 20e made of the transparent medium such as glass are prepared as shown in FIG. 2A. Similarly to the above description, assuming that the optical path length between the total reflection mirror $2_1$ and the total reflection mirror $24_2$ is set to a and the optical path length between the half mirror 22 and the total reflection mirror $24_3$ is set to b, the optical path makes a 45° angle to each principal plane of the parallel plates, so that the thickness of the parallel plate 20a is a/√2 and the thickness of the parallel plate 20b is b/√2.

The total reflection mirror and the half mirror are previously formed by coating in each of the parallel plates 20a, 20b, 20d, and 20e. In the embodiment, the total reflection mirror $24_3$ is formed on the surface of the parallel plate 20e which is opposite to the parallel plate 20b, the half mirror 22 and the total reflection mirror $24_2$ are formed on the surface of the parallel plate 20b which is opposite to the parallel plate 20a, and the total reflection mirror $24_1$ is formed on the surface of the parallel plate 20a which is opposite to the parallel plate 20d.

Figure 2B:
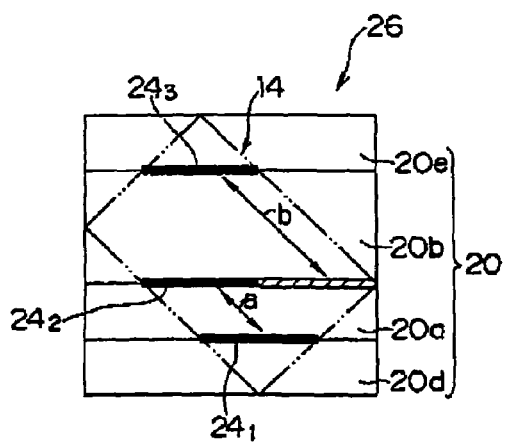

As shown in FIG. 2B, the four parallel plates are laminated and bonded in the order of 20d, 20a, 20b, and 20e to obtain a laminated body 26. In the parallel plate, the parallelism can be easily confirmed during bonding the parallel plates and the thickness can be relatively easily controlled. The first block 14 is cut from the laminated body 26 at a 45° angle to each principal plane of the parallel plates. (That is, the first block 14 is obtained by cutting the laminated body 26.) The angle of 45° is easily measured and the block can be cut out with high accuracy.

Figure 2C:
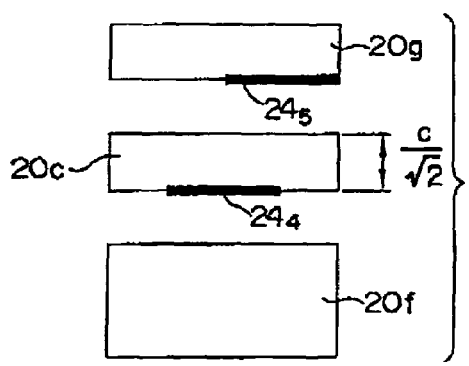
Figure 2D:
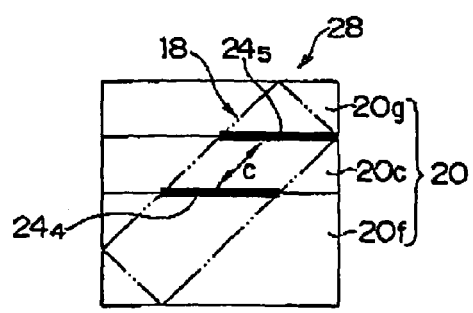

Then, as shown in FIG. 2C, three parallel plates 20c, 20f, and 20g are prepared. The thickness of the parallel plate 20c is set to c/√2 and the total reflection mirrors $24_4$ and $24_5$ are formed. As shown in FIG. 2D, the three parallel plates are laminated and bonded in the order of 20f, 20c, and 20g, and the second block 18 is cut from the obtained laminated body 28 at a 45° angle to each principal plane of the parallel plates. (That is the second block 18 is obtained by cutting the laminated body 28.)

Finally the beam splitting prism shown in FIG. 1 is formed by aligning and bonding the cut first block 14 and second block 18. The plurality of blocks which are cut with high accuracy are bonded to one another, so that the bonding can be performed with high accuracy.

In the process of manufacturing the beam splitting prism, except the parallelism of the bonding, consideration with respect to the rotational deviation must be given only in bonding the first block 14 and second block 18 in the final step, so that the beam splitting prism can be manufactured with extremely high accuracy by the above method.

In the case where the optical path length difference D is given between the two beams and the two beams are output with time difference Δt (delay time), when the refractive index of the transparent medium is set to n and speed of light in vacuum is set to c, the time difference Δt can be expressed by the following equation:

$$\Delta t = (D \times n)/c.$$

In the case where the transparent medium is made of glass such as BK-7, the refractive index n is about 1.51.

$$\Delta t = D \times 5.033 \times 10^{-9} s$$

In the case where one pico-second corresponding to a cycle period of a signal of 1 Tbps is assumed as the time difference Δt, the optical path length difference D becomes about 0.199 mm. When the optical path length difference D of about 0.199 mm is expressed by the difference between the thicknesses of the parallel plates, the difference is about D/2√2 and becomes about 0.070 mm (70 μm). The accuracy of the thickness of the parallel plate can be relatively easily adjusted at the level of 0.070 mm (70 μm).

Second Embodiment

The example in which the beam splitting prism is configured by combining the two blocks formed in the rectangular shape has been described in the first embodiment. The beam splitting prism according to a second embodiment has the configuration in which the optical components, through which the beam does not pass, are removed from the beam splitting prism, shown in FIG. 1. In the configuration of the second embodiment, since total reflection at the interface between the transparent medium and air can be utilized, the total reflection mirrors $24_1$, $24_3$, and $24_5$ can be omitted.

Figure 3A:
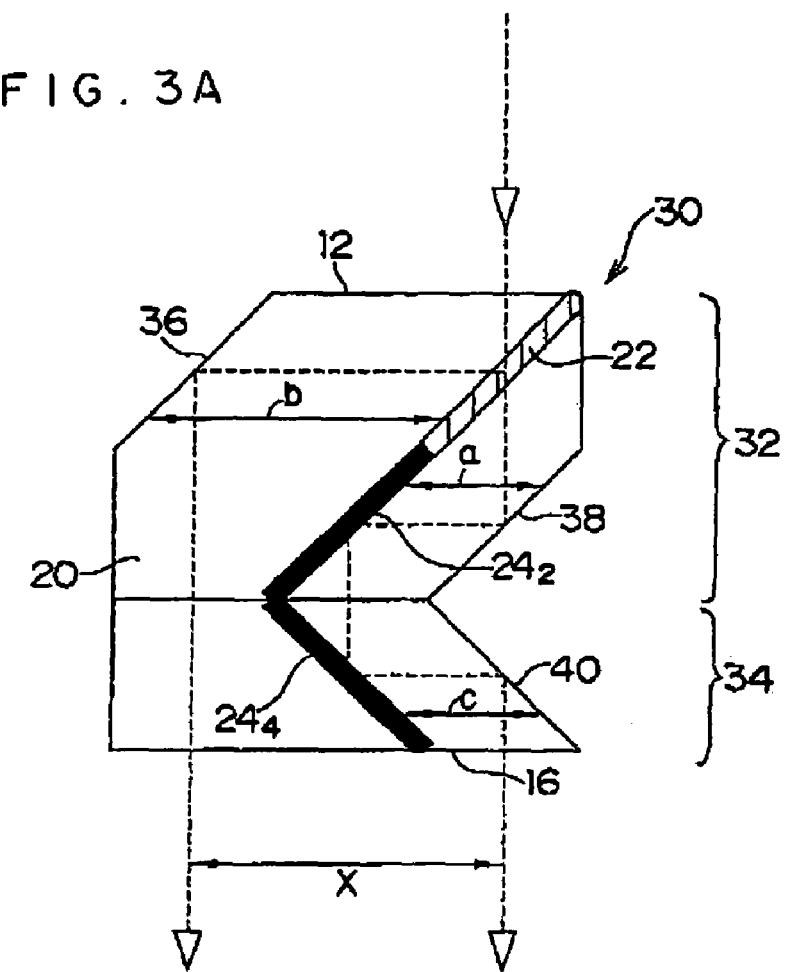
FIG. 3A is a side view showing the beam splitting prism according to a second embodiment and FIG. 3B is a view explaining a measuring method for preventing rotational deviation in a bonding surface.

As shown in FIG. 3A, a beam splitting prism 30 is configured by bonding a first block 32 and a second block 34. The incident end face 12, an oblique face 36, and an oblique face 38, and the half mirror 22 and the total reflection mirror $24_2$ are respectively provided in the first block 32. The outgoing end face 16 and an oblique face 40, and the total reflection mirror $24_4$ are provided in the second block 34.

In the beam splitting prism 30, the parallel beam input from the incident end face 12 into the prism is split with the half mirror 22 into two beams respectively having the same angle to the half mirror 22. The beam reflected with the half mirror 22 becomes parallel to the other beam, which is transmitted through the half mirror 22, by being reflected from the oblique face 36, and then the beam is output from the outgoing end face 16 which is formed so as to be orthogonal to the optical axis of the parallel beam after the reflection. On the other hand, the beam transmitted through the half mirror 22 is reflected in order with the oblique face 38, the oblique face 40, the total reflection mirror $24_2$, and the total reflection mirror $24_4$, and then the beam is output in coaxial relation with the incident light beam from the outgoing end face 16 which is formed so as to be orthogonal to the optical axis of the parallel beam after the reflection.

As described above, according to the beam splitting prism of the embodiment, the one incident beam can be split into the two parallel beams by the simple configuration including only the two blocks. Similarly to the first embodiment, the beam splitting prism of the second embodiment can be made with high accuracy and the alignment becomes easy to perform.

The total reflection mirror coating required for control of the optical path has large optical loss and polarization dependence. However, in the total reflection obtained in such a manner that the light beam is incident to the interface between, e.g. the glass and air from the glass side beyond a critical angle, the polarization dependence is absent and the optical loss is small. Accordingly, in the embodiment, while the optical loss is suppressed, the polarization characteristics can be improved by utilizing the total reflection at the interface between air and the transparent medium such as glass.

Figure 3B:
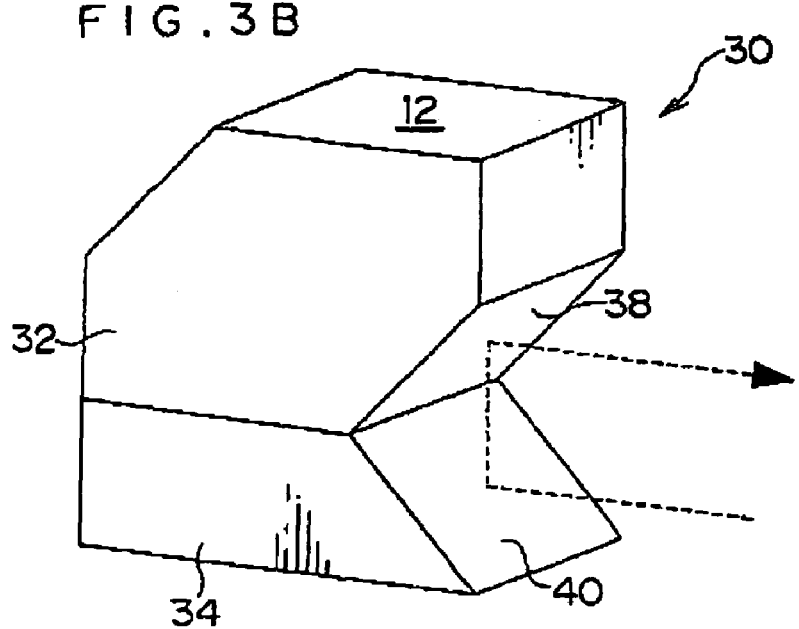

The beam splitting prism 30 shown in FIG. 3A can be manufactured in the same way as the first embodiment. In bonding the first block 32 and second block 34, as shown in FIG. 3B, the accuracy of the alignment can be increased by utilizing the oblique face 38 and the oblique face 40 which make a 90° angle with each other and observing the reflected light beam at the oblique faces 38 and 40.

Figure 4:
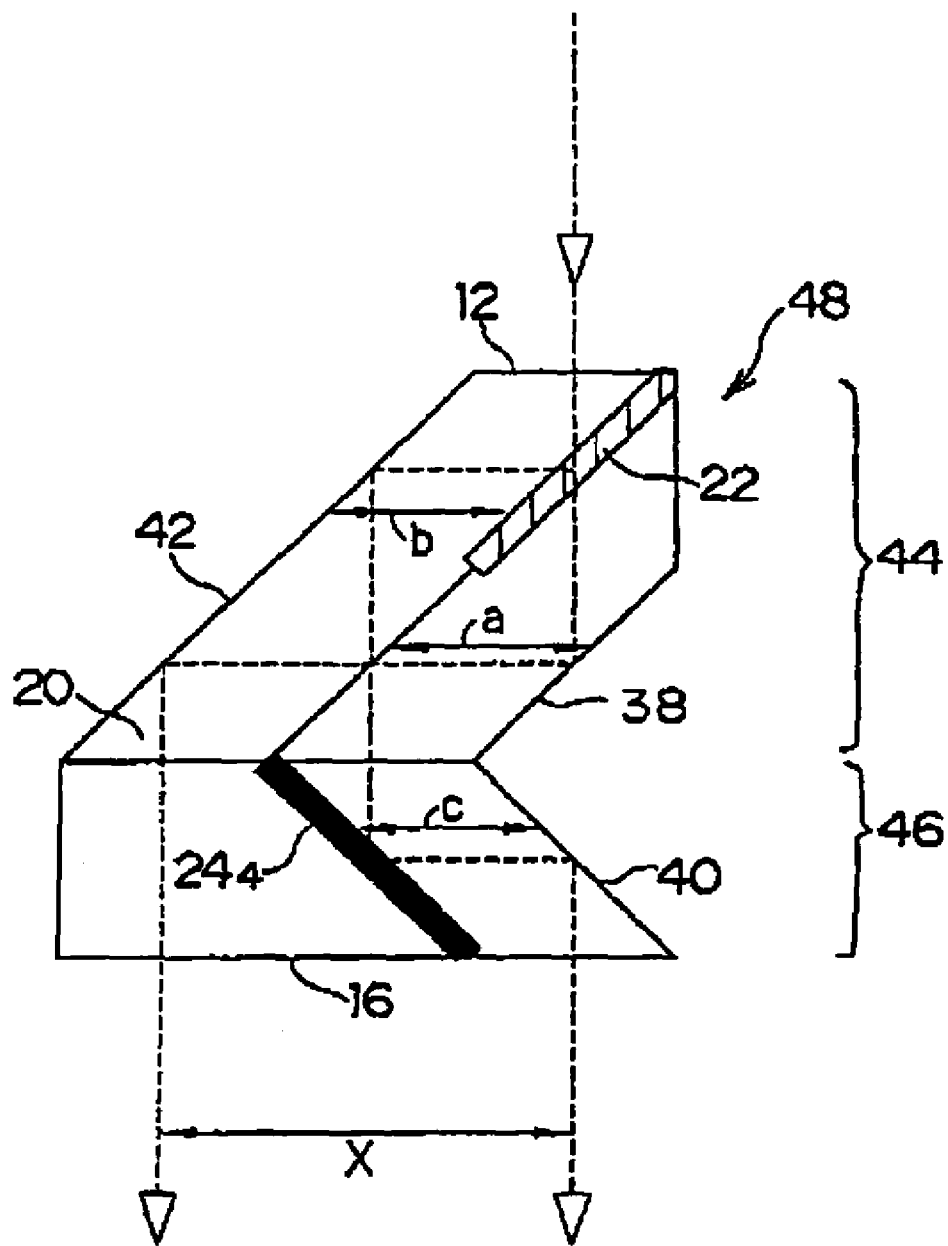
FIG. 4 is a side view showing the configuration of a modification of the beam splitting prism shown in FIG. 3.

The configuration further positively utilizing the total reflection at the interface between air and the transparent medium may be made as shown in FIG. 4. In the configuration, the total reflection mirror $24_2$ can be also omitted. That is to say, a beam splitting prism 48 is configured by bonding a first block 44 and a second block 46. The incident end face 12, the oblique face 36, and an oblique face 42, and the half mirror 22 are provided in the first block 44. The outgoing end face 16 and the oblique face 40, and the total reflection mirror $24_4$ are provided in the second block 46.

In order to secure simultaneity between the two outgoing light beams in the beam splitting prism 48, assuming that one beam has coaxial relation with the incident light beam and the other beam is output from the position where the other beam is shifted by X from the beam having coaxial relation with the incident light beam, an optical path length b between the half mirror 22 and the oblique face 42 opposite to the half mirror 22, an optical path length a between the surface on which the half mirror 22 is formed and the oblique face 38 opposite to the surface, and an optical path length c between the total reflection mirror $24_4$ and the oblique face 40 opposite to the total reflection mirror $24_4$ may satisfy the following relationship in the horizontal direction:

$a+b=b+c, a+b=X, b=c.$

Using X, each of a, b, c can be expressed as follows:

$a=b=c=X/2.$

In the case where optical path length difference D is given to the two beams while the outgoing positions are held, for example it is necessary to satisfy the following relationship. In this case, the sum of the optical path length b and the optical path length c is longer than the sum of the optical path length a and the optical path length b by the optical path length difference D, and the beam having coaxial relation with the incident light beam is delayed.

$b+c=a+b+D, a+b=X, b=c$

Using X and D, each of a, b, c can be expressed as follows:

$a=(X-D)/2, b=c=(X+D)/2.$

Third Embodiment

The beam splitting prism according to a third embodiment is one in which the two beam splitting prisms shown in FIG. 3A are combined in series.

In the first embodiment, the plurality of the beams are output while being shifted from one another in the predetermined direction, namely the beam splitting prism in which the incident beam is one-dimensionally split into two beams to be output has been described. The beam splitting prism in which the incident beam is two-dimensionally split into four beams to be output can be easily formed by combining the two beam splitting prisms of the first embodiment.

As shown in FIG. 5A, a beam splitting prism 301 including an incident end face $12_1$ and an outgoing end face $16_1$ and a beam splitting prism 302 including an incident end face $12_2$ and an outgoing end face $16_2$ are prepared. Though the beam splitting prisms 301 and 302 are ones in which the two beams are shifted from each other in an arrow X direction, since the beam splitting prisms 301 and 302 have the same configuration as the beam splitting prism shown in FIG. 3A, the detailed description will be omitted. As shown in FIG. 5B, the beam splitting prism 302 is arranged while being rotated by 90° relative to the beam splitting prism 301. As shown in FIGS. 5C and 5D, a combined beam splitting prism 50 is formed by closely bonding the outgoing end face $16_1$ of the beam splitting prism 301 and the incident end face $12_2$ of the beam splitting prism 302. The bonding surfaces of the beam splitting prisms 301 and 302 are adjusted so that the outgoing end face $16_1$ of the beam splitting prism 301 is exactly superimposed on the incident end face $12_2$ of the beam splitting prism 302.

The beam incident to the beam splitting prism 301 is split into two beams in the X direction with the beam splitting prism 301 of a first step, and each of the split beams is split into the two beams in a Y direction orthogonal to the X direction with the beam splitting prism 302 of a second step. With this configuration, it is possible to split the incident light beam into four beams combining the total of 2×2, and two-dimensionally arrange the four beams.

As described above, according to the combined beam splitting prism of the embodiment, the one incident beam can be split into four beams, which are parallel to one another and two-dimensionally arranged, with the simple configuration. In the combined beam splitting prism 50, the number of bonding surfaces in which care should be taken about the angle deviation is as small as three, so that the combined beam splitting prism can be assembled with high accuracy. Since at least one beam is output in coaxial relation with the incident light beam, the alignment becomes easy to perform and the beam splitting prism can be arranged into the optical path with high accuracy.

Further, the combined beam splitting prisms having the larger split number can be obtained by combining many beam splitting prisms in series. For example, in the case where two-split beam splitting prism is used, eight beams are obtained with three beam splitting prisms, sixteen beams are obtained with four beam splitting prisms, and thirty-two-beams are obtained with five beam splitting prisms.

In order to make all the optical path lengths of the four beams output from the combined beam splitting prism 50 to be equal, the beam splitting prisms 301 and 302 from which the two beams having the same optical path lengths are output may be combined. In the case where the optical path length difference D is given to each of the beams adjacent to each other in the four beams, the four-divided beams are output while having the optical path length differences 0, D, 2D, and 3D to the beam having coaxial relation with the incident light beam respectively in such a manner that the optical path length difference given by the beam splitting prism 301 is set to D and the optical path length difference in which D is multiplied by the split number n of each prism (n=2 in this case) namely 2D is given to the beam splitting prism 302.

A caution given when combining the beam splitting prisms is the polarization characteristics of the mirror coating. Generally the polarization dependence is small in a metallic film. However, in the case where the total reflection mirror or the half mirror is coated with a dielectric multi-layered film in order to decrease the optical loss as much as possible, reflectance and transmittance are changed to no small extent by the polarization characteristics of the mirror coating. Accordingly, in each prism constituting the combined beam splitting prism, it is necessary that all the coating films are formed so as to be suitable for the polarization of the incident beam in the combined state by performing the coating suitable for the polarized lights orthogonal to each other. In the case where it is necessary that the beam after the split is formed to be polarized light which is not p-polarized light nor s-polarized light with respect to the reflection plane of the beam splitting prism, it is desired to form the optimum polarized light by arranging a wave plate on the outgoing-light side of the combined beam splitting prism.

Figure 6A:
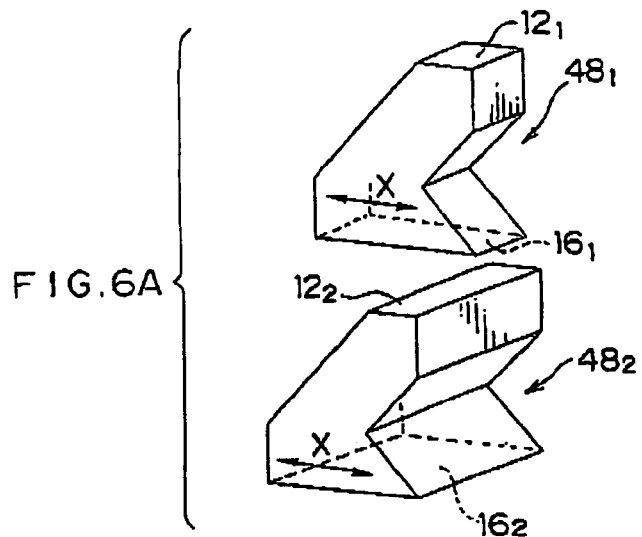
FIGS. 6A to 6C are views explaining the process of manufacturing the combined beam splitting prism according to a modification of the prism shown in FIGS. 5A to 5D.
Figure 6B:
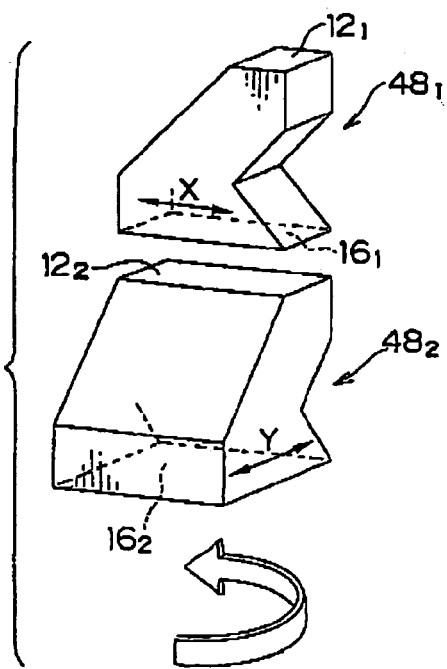
Figure 6C:
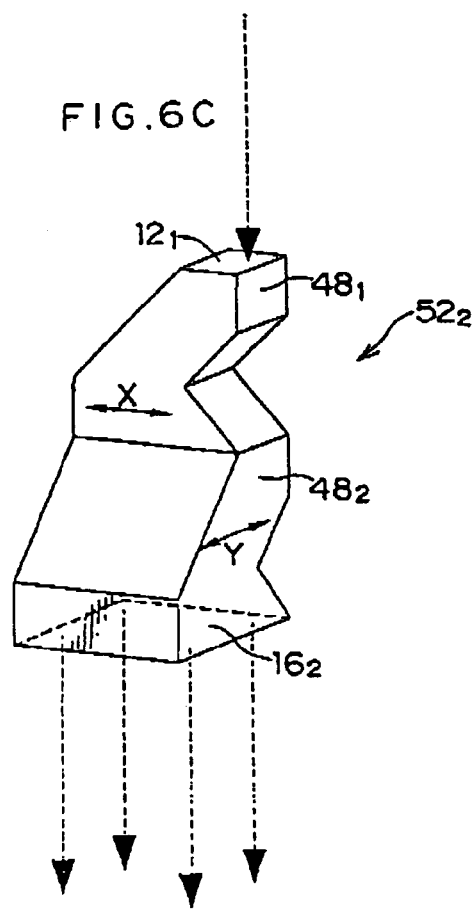

Another example of the combined beam splitting prism in which the two beam splitting prisms shown in FIG. 4 are combined in series is shown. A beam splitting prism $48_1$ including the incident end face $12_1$ and the outgoing end face $16_1$ and a beam splitting prism $48_2$ including the incident end face $12_2$ and the outgoing end face $16_2$ are prepared as shown in FIG. 6A. The beam splitting prisms $48_1$ and $48_2$ are ones in which the two beams are output while being shifted from each other in the arrow X direction. The beam splitting prism $48_2$ is arranged to be rotated by 90° relative to the beam splitting prism $48_2$ as shown in FIG. 6B, and a combined beam splitting prism 52 can be formed by closely bonding the outgoing end face $16_1$ of the beam splitting prism $48_1$ and the incident end face $12_2$ of the beam splitting prism $48_2$ as shown in FIG. 6C.

Fourth Embodiment

The beam splitting prism according to a fourth embodiment of the invention is one in which the incident beam is output while being one-dimensionally split into four beams. The beam is split into the two beams using one half mirror in the first embodiment, and the desired split number of beams can be obtained by increasing the number of half mirrors. In the fourth embodiment, the incident beam is split into four beams using three half-mirrors.

Figure 7:
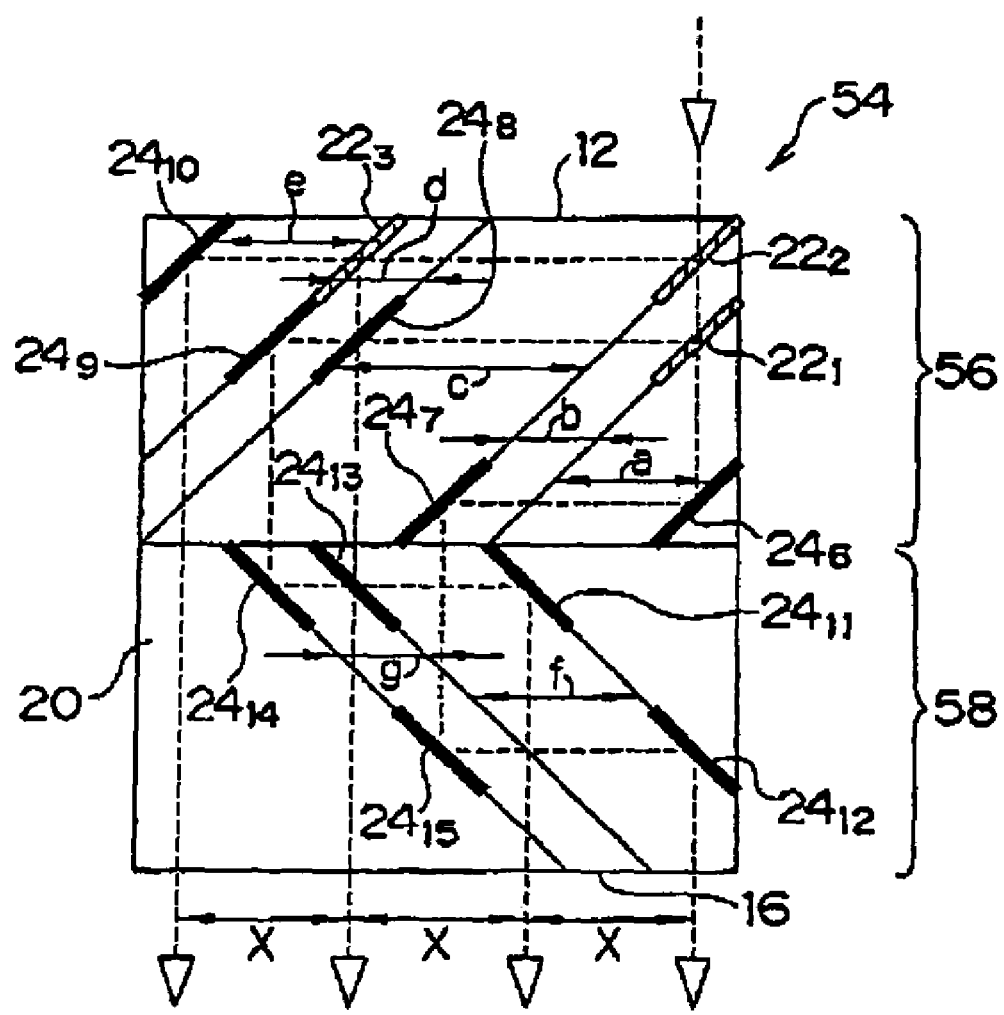
FIG. 7 is a side view showing the configuration of a beam splitting prism according to a fourth embodiment.

As shown in FIG. 7, a beam splitting prism 54 includes a first block 56 having the incident end face 12 and a second block 58 having the outgoing end face 16, and the first block 56 is bonded to the second block 58 so that the outgoing end face 16 becomes parallel to the incident end face 12. The first block 56 and the second block 58 are configured in the form of the rectangular shape by laminating the plurality of plate-shaped transparent mediums 20 respectively.

The half mirror 22 and the total reflection mirror 24 are properly and respectively provided between the laminated transparent mediums 20 so as to make a 45° angle to the incident end face 12 of the beam splitting prism 10. In the embodiment, three half mirrors $22_1$ to $22_3$ and five total reflection mirrors $24_6$ to $24_{10}$ are respectively provided between the transparent mediums 20 of the first block 56, and five total reflection mirrors $24_{11}$ to $24_{15}$ are respectively provided between the transparent mediums 20 of the second block 58.

In the beam splitting prism 54, the half mirror $22_2$ is arranged in the propagating direction of the parallel beam input into the prism from the incident end face 12. At first, the input parallel beam is split with the half mirror $22_2$ into the two beams forming the same angles with respect to the half mirror $22_2$.

The half mirror $22_3$ is arranged in the Propagating direction of the beam reflected with the half mirror $22_2$, and the input parallel beam is split with the half mirror $22_3$ into the two beams forming the same angles with respect to the half mirror $22_3$.

The total reflection mirror $24_{10}$ is arranged in the propagating direction of the beam transmitted through the half mirror $22_3$. By being reflected with the total reflection mirror $24_{10}$, the beam transmitted through the half mirror $22_3$ is made to be parallel to the beam reflected with the half mirror $22_3$, and the beam is output from the outgoing end face 16 which is formed to be orthogonal to the optical axis of the parallel beam after the reflection.

In the propagating direction of the beam reflected with the half mirror $22_3$, while the total reflection mirrors $24_8$ and $24_9$ are arranged so as to be parallel to the halt mirror $22_3$, the total reflection mirrors $24_{13}$ and $24_{14}$ are provided so as to make a 90° angle to the half mirror $22_3$. The beam reflected with the half mirror $22_3$ is reflected with the total refection mirrors $24_8$, $24_9$, $24_{14}$, and $24_{13}$ in order, and the beam is output from the outgoing end face 16 which is formed to be orthogonal to the optical axis of the parallel beam after the reflection.

On the other hand, the half mirror $22_1$ is arranged in the propagating direction of the beam transmitted through the half mirror $22_2$ and the input parallel beam is split with the half mirror $22_1$ into the two beams forming the same angles with respect to the half mirror $22_1$.

In the propagating direction of the beam reflected with the half mirror $22_1$, while the total reflection mirror $24_8$ is arranged so as to be parallel to the half mirror $22_1$, the total reflection mirrors $24_{13}$ and $24_{11}$ are provided so as to form the 90° angle to the half mirror $22_1$. The beam reflected with the half mirror $22_1$ is reflected with the total refection mirrors $24_8$, $24_{13}$, and $24_{11}$ in order, and the beam is output from the outgoing end face 16 which is formed to be orthogonal to the optical axis of the parallel beam after the reflection.

In the propagating direction or the beam transmitted through the half mirror $22_1$, while the total reflection mirrors $24_6$ and $24_8$ are arranged so as to be parallel to the half mirror $22_1$, the total reflection mirrors $24_{15}$ and $24_{12}$ are provided so as to make a 90° angle to the half mirror $22_1$. The beam transmitted through the half mirror $22_1$ is reflected with the total refection mirrors $24_6$, $24_8$, $24_{15}$, and $24_{12}$ in order, and the beam is output from the outgoing end face 16 which is formed to be orthogonal to the optical axis of the parallel beam after the reflection while the beam has coaxial relation with the incident light beam.

As described above, according to the beam splitting prism of the embodiment, one incident beam can be split into the four parallel beams by the simple configuration. When the plurality of beam splitting prisms are combined in series, the number of bonding surfaces is gradually increased and ensuring the accuracy of the parallelism or the optical path length becomes difficult. However, an increase in the split number of the individual beam splitting prism can increase the split number without sacrificing performance.

Similarly to the first embodiment, the beam splitting prism of the fourth embodiment can be made with high accuracy and the alignment becomes easy to perform. The beam splitting prism of the fourth embodiment can be manufactured in the same method of manufacturing the beam splitting prism of the first embodiment.

As shown in FIG. 7, when optical path lengths a to f between mirrors are defined in the horizontal direction, assuming that one beam has coaxial relation with the incident light beam and the adjacent beam is output at the position where the adjacent beam is shifted by X from the beam having coaxial relation with the incident light beam, the following relations need to be satisfied in order to secure simultaneity among the outgoing light beams.

$$c+d+e=3X,\ c+2d+g=3X,\ b+c+f=3X,\ a+b+f+g=3X$$

Further, it is necessary that the following relations hold.

$$c+2d-g=2X, \; c+c-f=X \; a++b-f-g=0$$

The following case can be cited as an example in which the above relations hold.

$$a=X, \; b=X/2, \; c=3X/2, \; d=X/2, \; e=X, f=X, \; g=X/2$$

or $$a=X/2, \; b=X, \; c-X, \; d=3X/4, \; e=5X/4, f=X, \; g=X/2$$

In the case where the optical path length difference D is given to the two beams adjacent to each other while the outgoing positions are maintained, for example, it is necessary that the optical path lengths a to f take one of the following values.

$$a-X, \; b=(X+3D)/2, \; c=(3X-D)/2, \; d=(X+D)/2, \; e=X, \; f=X+D, \; g=(X+D)/2$$

or $$a=X-2Y, \; b=(X-D)/2, \; c=3(X+D)/2, \; d=(X-D)/2, \; e=X-D, f=X+D, \; g=(X+D)/2$$

or $$a=X-D, \; b=(X+D)/2, \; c=(3X+D)/2, \; d=X/2, \; e=X-D/2, \; f=X+D, \; g=(X+D)/2$$

Fifth Embodiment

The example in which the beam splitting prism is configured by combining the two blocks formed in the rectangular shape has been described in the fourth embodiment. The beam splitting prism according to a fifth embodiment has the configuration in which the optical components, through which the beam does not pass, are removed from the beam splitting prism shown in FIG. 7. In the configuration of the fifth embodiment, since total reflection at the interface between air and the transparent medium can be utilized, the total reflection mirrors $24_6$, $24_{10}$, $24_{11}$, and $24_{12}$ can be omitted.

Figure 8:
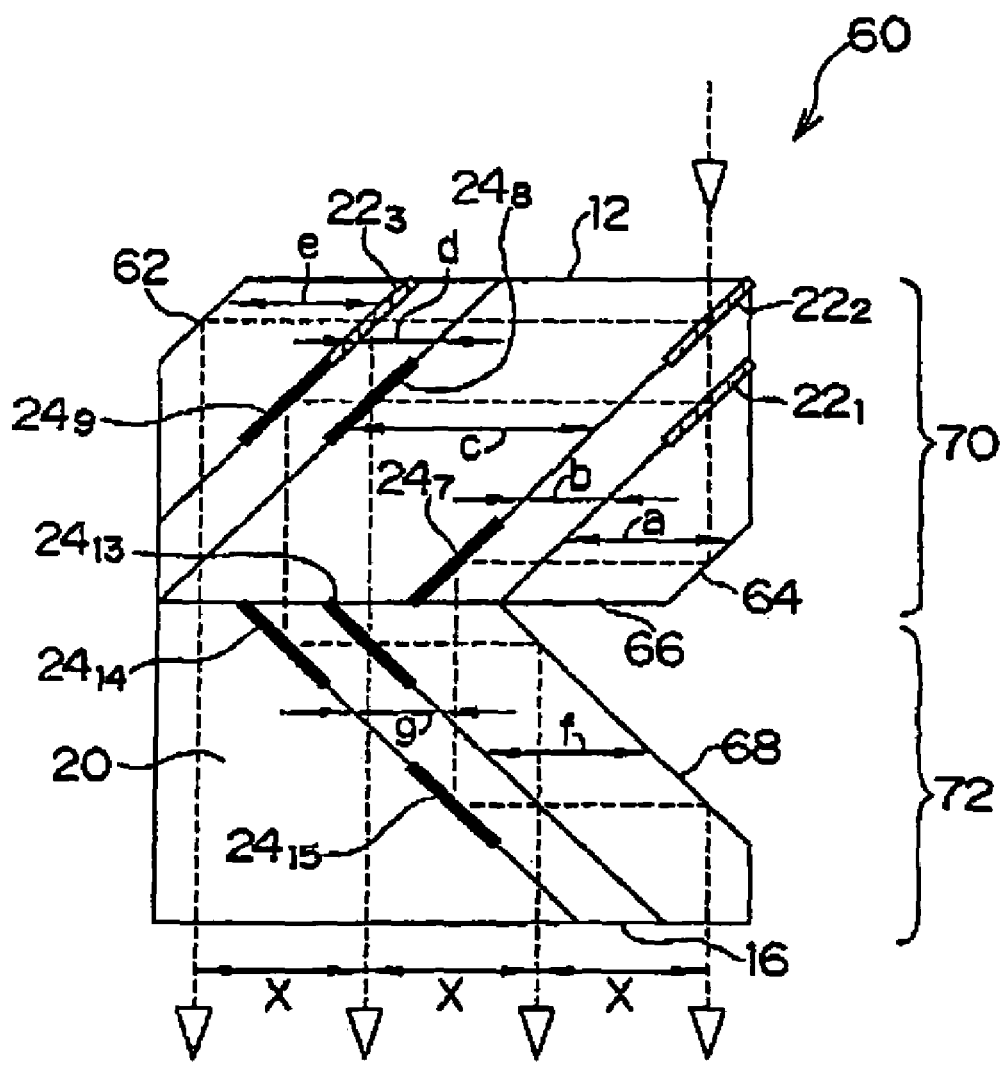
FIG. 8 is a side view showing the configuration of a beam splitting prism according to a fifth embodiment.

As shown in FIG. 8, a beam splitting prism 60 is configured by bonding a first block 70 and a second block 72. The incident end face 12, an oblique face 62, an oblique face 64, and a horizontal face 66, and the half mirrors $22_1$ to $22_3$ and total reflection mirrors $24_7$ to $24_9$ are respectively provided in the first block 32. The outgoing end face 16 and an oblique face 68, and the total reflection mirrors $24_{13}$ to $24_{15}$ are respectively provided in the second block 72.

For the optical path of the four split beams, the description will be omitted because the optical path is the same as that of the fourth embodiment. However, according to the configuration of the fifth embodiment, the one incident beam can be split into the four beams parallel to one another with the simple configuration including only the two blocks. Similarly to the first embodiment, the beam splitting prism of the fifth embodiment can be made with high accuracy and the alignment becomes easy to perform. While the optical loss is suppressed, the polarization characteristics can be improved by utilizing the total reflection at the interface between air and the transparent medium.

Figure 9:
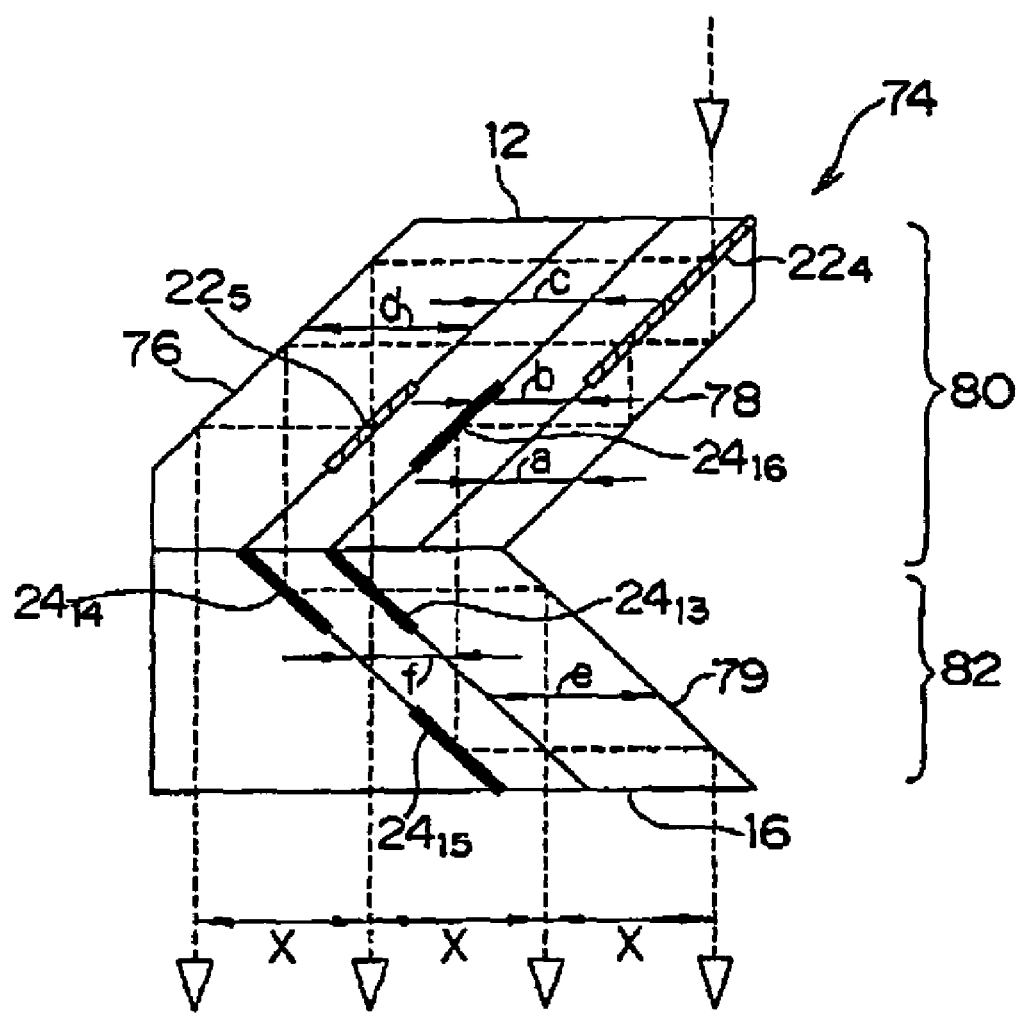
FIG. 9 is a side view showing the configuration of a modification of the beam splitting prism shown in FIG. 8.
Figure 11:
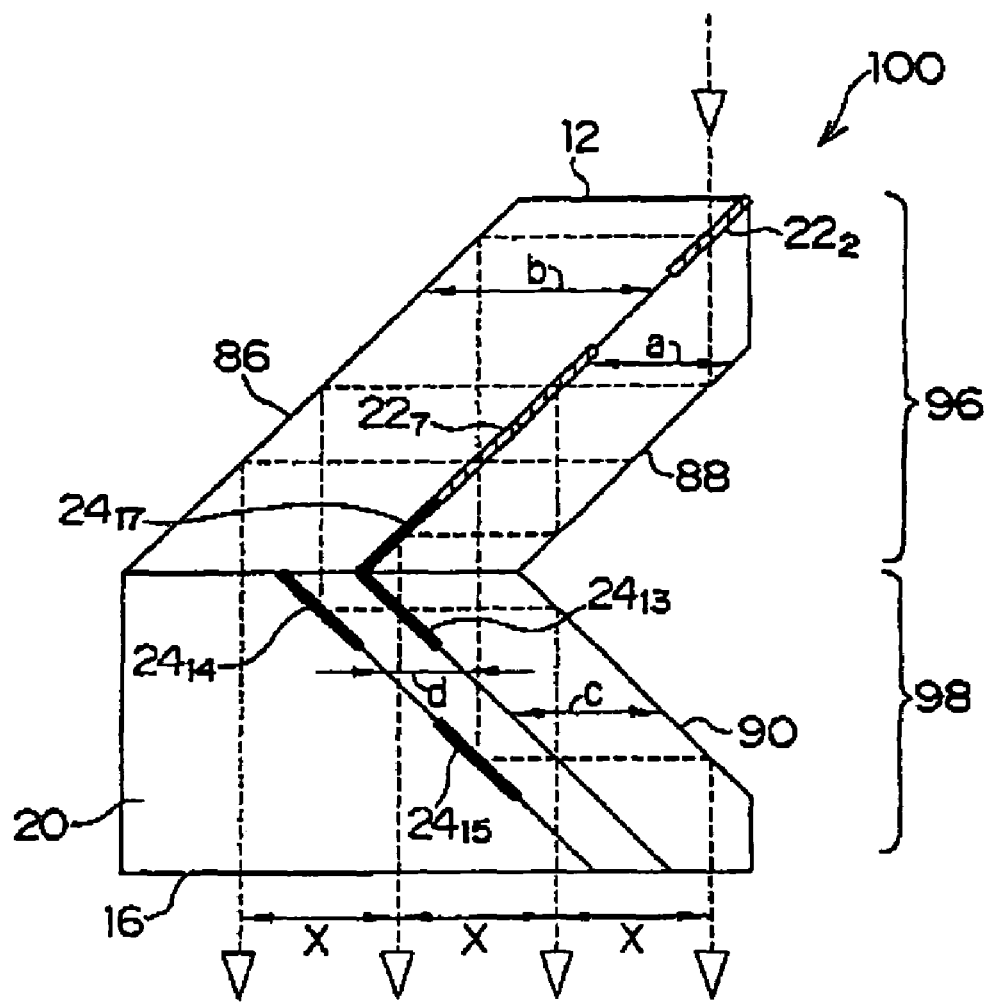
FIG. 11 is a side view showing the configuration of a modification of the beam splitting prism shown in FIG. 8.

As shown in FIGS. 9 to 11, the configurations further positively utilizing the total reflection at the interface between air and the transparent medium may be made. In these configurations, the total reflection mirror can be further omitted. The number of components (the number of plate-shaped transparent mediums 20 laminated) is decreased and the configuration is further simplified.

A beam splitting prism 74 shown in FIG. 9 is configured by bonding a first block 80 and a second block 82. The incident end face 12, an oblique face 76, and an oblique face 78, and half mirrors $22_4$ and $22_5$ and a total reflection mirror $24_{16}$ are respectively provided in the first block 80. The outgoing end face 16 and an oblique face 79, and the total reflection mirrors $24_{13}$ to $24_{15}$ are respectively provided in the second block 82.

In the beam splitting prism 74, the parallel beam input from the incident end face 12 in the prism is split with the half mirror $22_4$ into the two beams forming the same angles with respect to the half mirror $22_4$.

The beam reflected with the half mirror $22_4$ is reflected with the oblique face 76, and the beam is incident to the half mirror $22_5$. The beam reflected with the half mirror $22_5$ is reflected with the oblique face 76 again, and the beam is output from the outgoing end face 16. The beam transmitted through the half mirror $22_5$ is reflected with the total reflection mirror $24_{13}$ and the oblique face 68 in order, and the beam is output from the outgoing end face 16.

The beam transmitted through the half mirror $22_4$ is reflected with the oblique face 78, and the beam is incident to the half mirror $22_4$. The beam reflected with the half mirror $22_4$ is reflected with the oblique face 78, the total reflection mirror $24_{16}$, the total reflection mirror $24_{15}$, and the oblique face 79 in order, and the beam is output from the outgoing end face 16 having coaxial relation with the incident light beam. The beam transmitted through the half mirror $22_4$ is reflected with the oblique face 76, the total reflection mirror $24_{14}$, and the oblique face 79 in order, and the beam is output from the outgoing end face 16.

The definition of the optical path lengths a to f between mirrors in the horizontal direction is shown in FIG. 9, and the optical path lengths of the four beams become equal to one another when satisfying the following relations:

$$a=X/2, \; b=X/2, \; c=X/2, \; d=X, \; e=X, f=X/2.$$

In the case the optical path length difference D is given to the two beams adjacent to each other while the outgoing positions are maintained, it is necessary that the optical path lengths a to f take the following values:

$$a=(X-D)/2, \; b=(X+5D)/2, \; c=(X-D)/2, \; d=X-D, \; e=X+D, f=(X+D)/2.$$

A beam splitting prism 84 shown in FIG. 10 is configured by bonding a first block 92 and a second block 94. The incident end face 12, an oblique face 86, and an oblique face 88, and half mirrors $22_1$, $22_2$, and $22_6$ are respectively provided in the first block 92. The outgoing end face 16 and an oblique face 90, and the total reflection mirrors $24_{13}$ to $24_{15}$ are respectively provided in the second block 94.

In the beam splitting prism 84, the parallel beam input from the incident end face 12 in the prism is split with the half mirror $22_2$ into the two beams forming the same angles with respect to the half mirror $22_2$.

The beam reflected with the half mirror $22_2$ is incident to the half mirror $22_6$. The beam reflected with the half mirror $22_6$ is reflected with the oblique faces 88 and 86 in order, and the beam is output from the outgoing end face 16. The beam transmitted through the half mirror $22_6$ is reflected with the oblique face 86, the total reflection mirror $24_{15}$, and the oblique face 90 in order, and the beam is output from the outgoing end face 16 having coaxial relation with the incident light beam.

The beam transmitted through the half mirror $22_2$ is incident to the half mirror $22_1$. The beam reflected with the half mirror $22_1$ is reflected with the oblique face 86, the total reflection mirror $24_{13}$, and the oblique face 90 in order, and the beam is output from the outgoing end face 16. The beam transmitted through the half mirror $22_1$ is reflected with the oblique face 88, the oblique face 86, the total reflection mirror $24_{14}$, and the total reflection mirror $24_{13}$ in order, and the beam is output from the outgoing end face 16.

The definition of the optical path lengths a to f between mirrors in the horizontal direction is shown in FIG. 10, and the optical path lengths of the four beams become equal to one another when satisfying the following relations:

$$a=X/2, b=X/2, c=X/2, d=X, e=X, f=X/2.$$

In the case the optical path length difference D is given to the two beams adjacent to each other while the outgoing positions are maintained, it is necessary that the optical path lengths a to f take the following values:

$$a=(X-D)/2, b=(X-D)/2, c=(X-D)/2, d=X+2D\ e=X+D, f=(X+D)/2.$$

A beam splitting prism 100 shown in FIG. 11 is configured by bonding a first block 96 and a second block 98. The incident end face 12, the oblique face 86, and the oblique face 88, and half mirrors $22_2$ and $22_7$ and a total reflection mirror $24_{17}$ are respectively provided in the first block 96. The outgoing end face 16 and the oblique face 90, and the total reflection mirrors $24_{13}$ to $24_{15}$ are respectively provided in the second block 98.

In the beam splitting prism 100, the parallel beam input from the incident end face 12 in the prism is split with the half mirror $22_2$ into the two beams forming the same angles with respect to the half mirror $22_2$.

The beam reflected with the half mirror $22_2$ is reflected with the oblique face 86, and the beam is incident to the half mirror $22_7$. The beam reflected with the half mirror $22_7$ is reflected with the oblique faces 86 again, and the beam is output from the outgoing end face 16. The beam transmitted through the half mirror $22_7$ is reflected with the total reflection mirror $24_{15}$ and the oblique face 90 in order, and the beam is output from the outgoing end face 16 in coaxial relation with the incident light beam.

The beam transmitted through the half mirror $22_2$ is reflected with the oblique face 88, and the beam is incident to the half mirror $22_7$. The beam reflected with the half mirror $22_7$ is reflected with the oblique face 88, the total reflection mirror $24_{17}$, the total reflection mirror $24_{13}$, and the oblique face 90 in order, and the beam is output from the outgoing end face 16. The beam transmitted through the half mirror $22_7$ is reflected with the oblique face 86, the total reflection mirror $24_{14}$, and the oblique face 90 in order, and the beam is output from the outgoing end face 16.

The definition of the optical path lengths a to f between mirrors in the horizontal direction is shown in FIG. 11, and the optical path lengths of the four beams become equal to one another when satisfying the following relations:

$$a=X, b=3X/2, c=X, d=x/2.$$

However, in the configuration shown in FIG. 11, since the number of components is small, the optical path length difference D can not be added to all the two beams adjacent to each other.

Sixth Embodiment

The beam splitting prism according to a sixth embodiment is one in which the two beam splitting prisms shown in FIG. 10 are combined in series.

The plurality of the beams are output while being shifted from one another in the predetermined direction, namely the beam splitting prism in which the incident beam is one-dimensionally split into the four beams to be output has been described in the fourth and fifth embodiments. By combining the two beam splitting prisms of the fourth and fifth embodiments, the beam splitting prism in which the incident beam is two-dimensionally split into sixteen beams to be output can easily be formed.

Figure 12A:
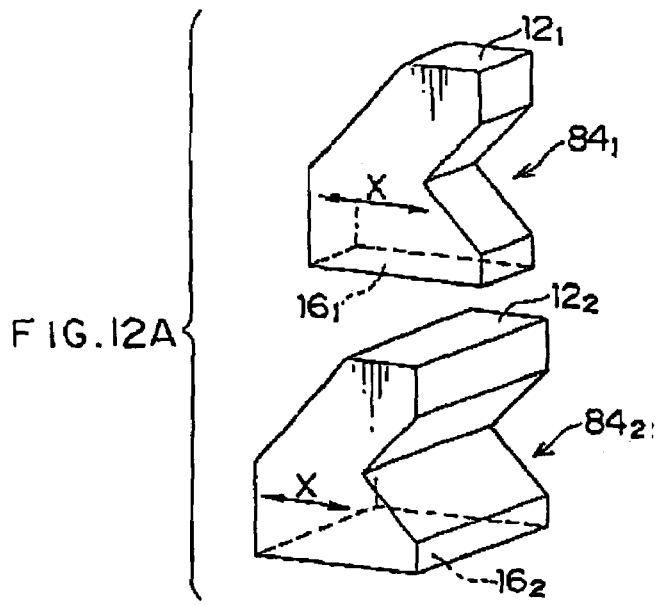
FIGS. 12A to 12C are views explaining the process of manufacturing a combined beam splitting prism according to a sixth embodiment.
Figure 12B:
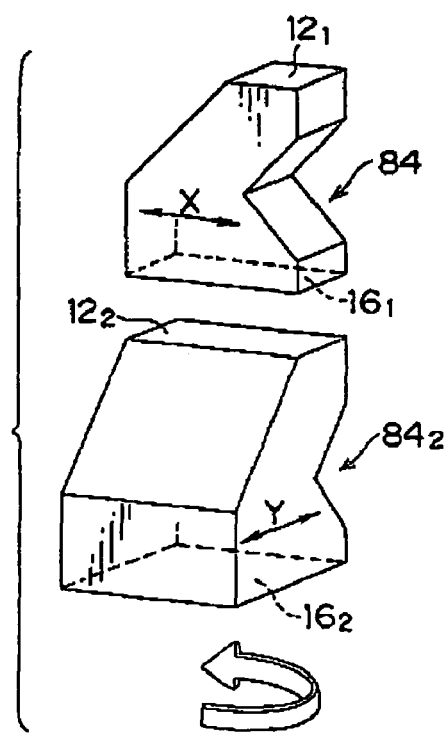
Figure 12C:
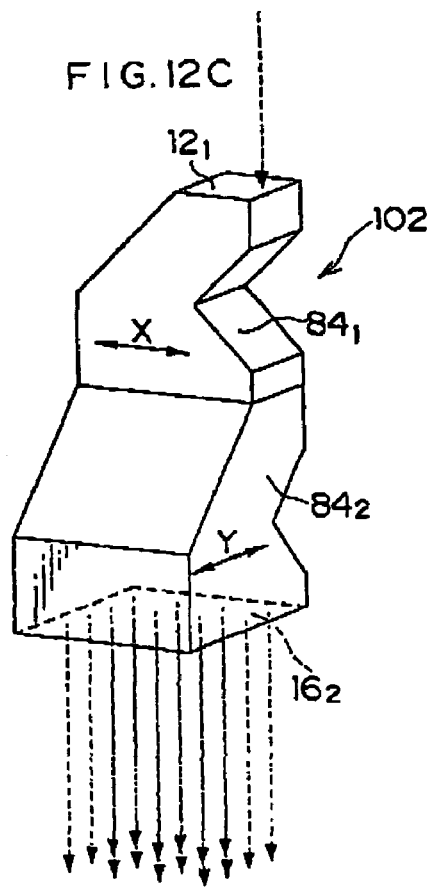

As shown in FIG. 12A, a beam splitting prism $84_1$ including the incident end face $12_1$ and the outgoing end face $16_1$, and a beam splitting prism $84_2$ including the incident end face $12_2$ and the outgoing end face $16_2$ are prepared. Though the beam splitting prisms $84_1$ and $84_2$ are ones in which the four beams are shifted from one another in the arrow X direction, since the beam splitting prisms $84_1$ and $84_2$ have the same configuration as the beam splitting prism shown in FIG. 10, the detailed description will be omitted. As shown in FIG. 12B, the beam splitting prism $84_2$ is arranged while being rotated by 90° relative to the beam splitting prism $84_1$. As shown in FIG. 12C, a combined beam splitting prism 102 is formed by closely bonding the outgoing end face $16_1$ of the beam splitting prism $84_1$ and the incident end face $12_2$ of the beam splitting prism $84_2$. The thickness of the bonding surfaces of the beam splitting prisms $84_1$ and $84_2$ are adjusted so that the outgoing end face $16_1$ of the beam splitting prism $84_1$ is exactly superimposed on the incident end face $12_2$ of the beam splitting prism $84_2$.

The beam incident to the beam splitting prism $84_1$ is split into four beams in the X direction with the beam splitting prism $84_1$ of the first step, and the each of the split beams is split into four beams in the Y direction orthogonal to the x direction with the beam splitting prism $84_2$ of the second step. With this configuration, it is possible to split the incident light beam into sixteen beams combining the total of 4×4, and two-dimensionally arrange the sixteen beams.

As described above, according to the combined beam splitting prism of the embodiment, the one incident beam can be split into sixteen beams, which are parallel to one another and two-dimensionally arranged, with the simple configuration. In the combined beam splitting prism, the number of bonding surfaces in which care should be taken about the angle deviation is as small as three, so that the combined beam splitting prism can be assembled with high accuracy. Since at least one beam is output in coaxial relation with the incident light beam, the alignment becomes easy to perform and the beam splitting prism can be arranged into the optical path with high accuracy.

In order to make all the optical path lengths of the sixteen beams output from the combined beam splitting prism 102 to be equal, the beam splitting prisms $84_1$ and $84_2$ from which the two beams having the same optical path lengths are output may be combined. In the case where the optical path length difference D is given to each of the beams adjacent to each other in the sixteen beams, the sixteen-divided beams are output while having the optical path length differences 0, D, 2D, 3D, . . . , 15D to the beam having coaxial relation with the incident light beam respectively in such a manner that the optical path length difference given by the beam splitting prism $84_1$ is set to D, and the optical path length difference in which D is multiplied by the split number n of each prism (n=4 in this case), namely 4D is given to the beam splitting prism $84_2$.

The beam splitting prism which splits the incident light beam into the two beams can be also combined with the beam splitting prism which splits the incident light beam into the four beams. In this case, the combined beam splitting prism which splits the one incident beam into the eight parallel beams can be obtained.

Seventh Embodiment

The beam splitting prism according to a seventh embodiment is one in which the incident beam is one-dimensionally split into eight beams to be output. In the embodiment, the incident beam is split into eight beams using five half mirrors.

Figure 13:
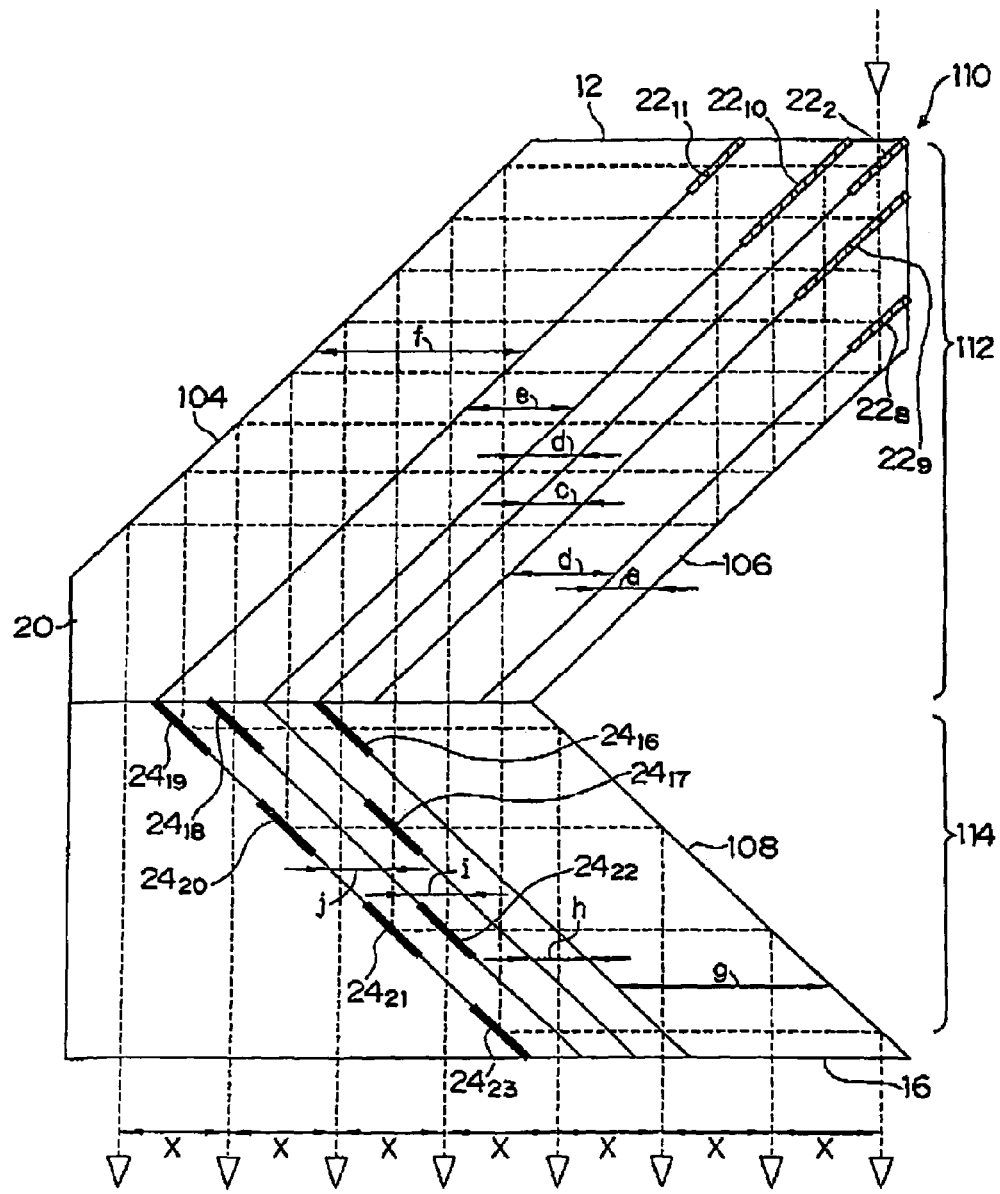
FIG. 13 is a side view showing the configuration of a beam splitting prism according to a seventh embodiment.

As shown in FIG. 13, a beam splitting prism 110 is configured by bonding a first block 112 and a second block 0.114. The incident end face 12, an oblique face 104, and an oblique face 106, and half mirrors $22_2$ and $22_8$ to $22_{11}$ are respectively provided in the first block 112. The outgoing end face 16 and an oblique face 108, and total reflection mirrors $24_{16}$ to $24_{33}$ are respectively provided in the second block 114. Though the detailed description is omitted, one beam incident from the incident end face 12 is split into eight beams with the half mirrors $22_2$ and $22_8$ to $22_{11}$. In the eight-split beams, while the optical path lengths are made to be equal to one another by being reflected with the total reflection mirrors $24_{16}$ to $24_{23}$ and the oblique faces which become the interface between air and the transparent medium, the outgoing angles are adjusted and the beams are output from the outgoing end face 16.

AS described above, according to the combined beam splitting prism of the embodiment, one incident beam can be split into the eight parallel beams by the simple configuration including only the two blocks. Similarly to the first embodiment, the beam splitting prism of the seventh embodiment can be made with high accuracy and the alignment becomes easy to perform. Further, while the optical loss is suppressed, the polarization characteristics can be improved by utilizing the total reflection at the interface between air and the transparent medium.

The definition of the optical path lengths a to f between mirrors in the horizontal direction is shown in FIG. 13, and the optical path lengths of the eight beams become equal to one another when satisfying the following relations:

$$a=X/2, b=X, c=X/2, d=X/2, e=X, f=2X, g=2X, h=X/2, I=X/2, j=X/2.$$

In the case the optical path length difference D is given to the two beams adjacent to each other while the outgoing positions are maintained, it is necessary that the optical path lengths a to f take the following values:

$$a=(X-D)/2, b=X-D, c=(X-D)/2, d=(X-D)/2, e=X-D, f=2X+5D, g=2X+2D, h=(X+D)/2, I=(X+D)/2, j=(X+D)/2.$$

Figure 14:
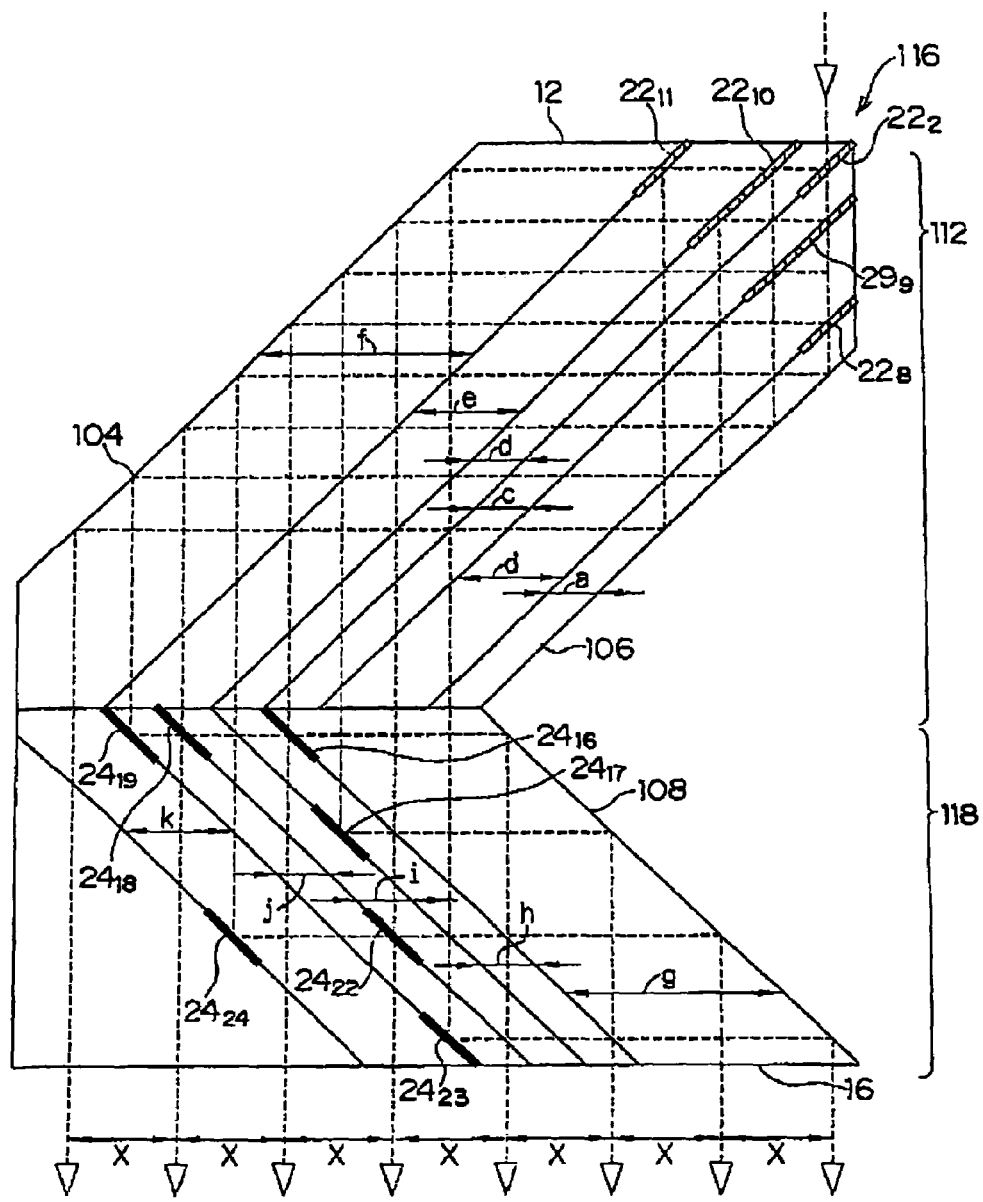
FIG. 14 is a side view showing the configuration of a modification of the beam splitting prism shown in FIG. 13.

Though the number of components is increased, the beam splitting prism 116 including a second block 118 having the configuration, in which the total reflection mirror $24_{24}$ is provided instead of the total reflection mirrors $24_{20}$ and $24_{21}$ of the second block 114 shown in FIG. 13, may be formed as shown in FIG. 14. In the configuration, the number of total reflections of each beam becomes equal.

The definition of the optical path lengths a to f between mirrors in the horizontal direction is shown in FIG. 14, and the optical path lengths of the eight beams become equal to one another when satisfying the following relations:

$$a=X/2, b=X, c=X/2, d=X/2, e=X, f=2\times, g=2X, h=X/2, I=X/2, j=X/2, k=X.$$

In the case the optical path length difference D is given to the two beams adjacent to each other while the outgoing positions are maintained, it is necessary that the optical path lengths a to f take the following values:

$$a=(X-D)/2, b=X-D, c=(X-D)/2, d=(X-D)/2, e=X-D, f=2X+5D, g=2X+2D, h=(x+D)/2, I=(X+D)/2=j=(X+D)/2, k=X+D.$$

Figure 15:
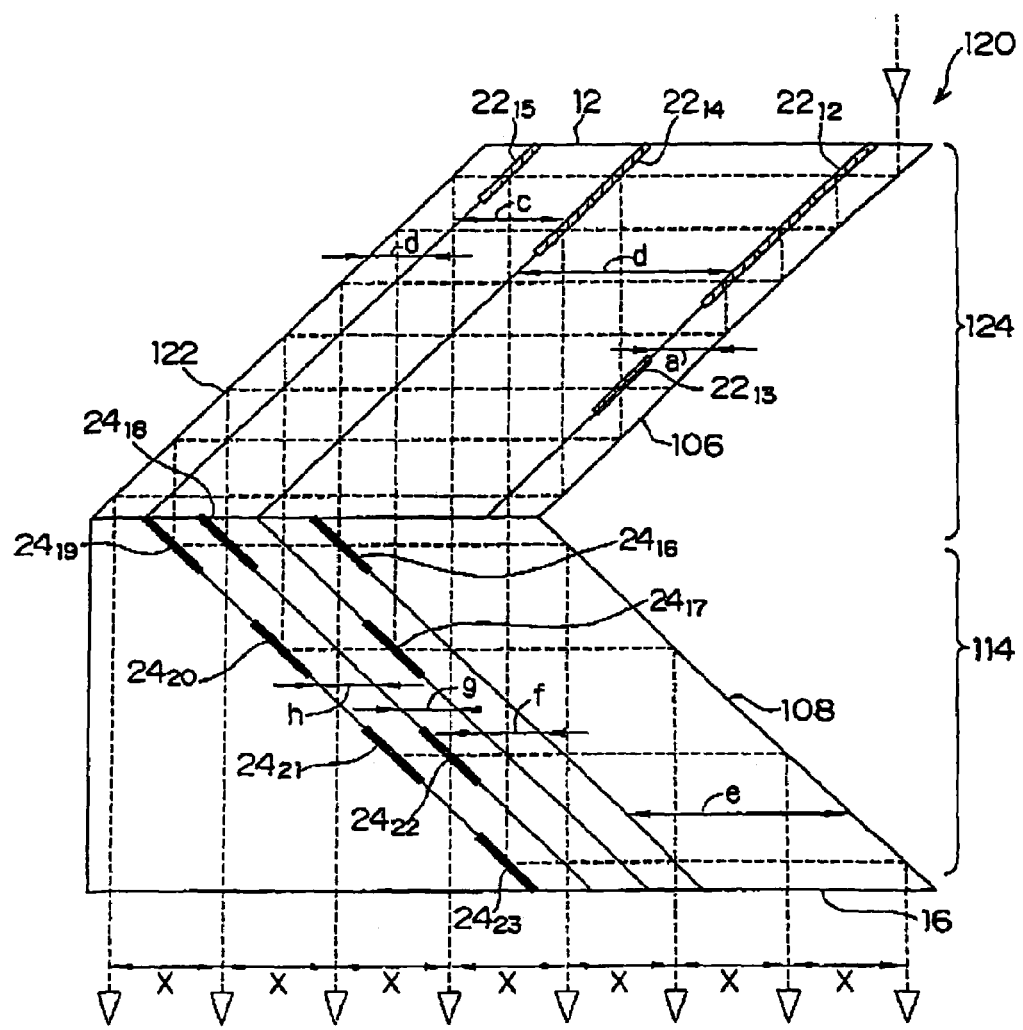
FIG. 15 is a side view showing the configuration of a modification of the beam splitting prism shown in FIG. 13.

A beam splitting prism 120 including a first block 124 having the configuration, in which the number of components of the first block 112 shown in FIG. 13 is significantly decreased and the number of half mirrors is also decreased to the four half mirrors $22_{12}$ to $22_{15}$, may be formed as shown in FIG. 15.

The definition of the optical path lengths a to f between mirrors in the horizontal direction is shown in FIG. 15, and the optical path lengths of the eight beams become equal to one another when satisfying the following relations:

$$a=X/2, b=X, c=X/2, d=X/2, e=2X, f=X/2, g=X/s, h=X/2.$$

In the case the optical path length difference D is given to the two beams adjacent to each other while the outgoing positions are maintained, it is necessary that the optical path lengths a to f take the following values:

$$a=(X-D)/2, b=2X-2D, c=X-D, d=(X+13D)/2, e=2X+2D, f=(X+D)/2, g=(X+D)/2, h=(X+D)/2.$$

In the same way as the third and sixth embodiments, the beam splitting prism in which the incident beam is two-dimensionally split into sixty-four beams to be output can be easily configured by combining the two beam splitting prisms in which the incident beam is one-dimensionally split into the eight beams to be output. In the prism, the number of bonding surfaces in which care should be taken about the angle deviation is as small as three, so that the prism can be assembled with high accuracy.

In the case where the optical path length difference D is given to each of the beams adjacent to each other in the sixty-four beams, the sixty-four-split beams are output while having the optical path length differences 0, D, 2D, 3D, . . . , 63D to the beam having coaxial relation with the incident light beam respectively in such a manner that the optical path length difference given by one of the beam splitting prisms is set to D, and the optical path length difference in which D is multiplied by the split number n of each prism (n=4 in this case), namely 8D is given to the other beam splitting prism. The beam splitting prism which splits the incident light beam into the eight beams may be combined with the beam splitting prism which splits the incident light beam into the two beams or the beam splitting prism which splits the incident light beam into the four beams.

Eighth Embodiment

The beam splitting prisms in which one beam is split into the plurality of beams to be output have been described in the first to seventh embodiments. Further, in these beam splitting: prisms, not only the beams can be simultaneously output while the optical path lengths of the beams are made to be equal to one another, but also the beams can be output while the beams respectively have the time difference of a predetermined interval by adding the optical path length difference.

In an eighth embodiment, an all-optical switching device in which the beam splitting prism is incorporated in the splitting/delaying means of the optical switch described in Japanese Patent Application Laid-Open (JP-A) No. 2003-149693 will be described. The all-optical switching device is an optical switch (transmittance-change utilizing type or transmission type) which uses a change in transmittance (reflectance) of an optical-switching film as a switching mechanism and performs on-off control to an output of signal pulse transmitted through the optical-switching film.

Figure 16A:
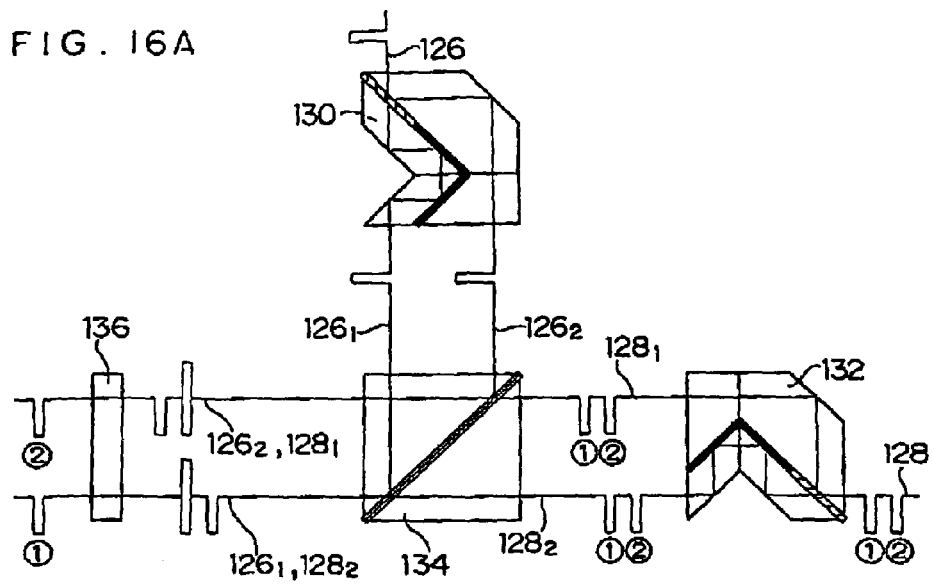
FIGS. 16A and 16B are conceptual illustrations showing the configuration of an all-optical switching device using the beam splitting prism of the invention.

As shown in FIG. 16A, the all-optical switching device according to the eighth embodiment includes a beam splitting prism 130 as means for splitting a conrtol pulse 126 used for read timing control into conrtol pulses $126_1$ and 1262, a beam splitting prism 132 as means for splitting a signal pulse 128 into signal pulses $128_1$ and $128_2$ and giving different delay time to the split signal pulses, a half mirror 134 that multiplexes the conrtol pulses $126_1$, $126_2$ and the signal pulses $128_1$, $128_2$ together, and a disk type optical switch 136.

A half mirror 134 reflects the conrtol pulses $126_1$ and $126_2$ input from the beam splitting prism 130 toward the optical switch 136 side. The half mirror 134 is arranged in the propagating direction of the conrtol pulse and signal pulse so that the half mirror 134 transmits the signal pulses 1281 and 1282 input from the beam splitting prism 132 and the signal pulses $128_1$ and $128_2$ are incident to the optical switch 136. While the same spot can be irradiated with the conrtol pulse $126_1$ and the signal pulse $128_2$, the same spot can be irradiated with the conrtol pulse $126_2$ and the signal pulse $128_1$ in such a manner that the conrtol pulses and the signal pulses are incident to the optical switch 136 while the conrtol pulse and the signal pulse are multiplexed.

The beam splitting prism having the configuration shown in FIG. 3A is used as the beam splitting prisms 130 and 132. Using the beam splitting prism 130, the incident conrtol pulse 126 is split into the two conrtol pulses $126_1$ and $126_2$ having the same optical path lengths and the two conrtol pulses are output. Using the beam splitting prism 132, the incident signal pulse 128 is split into the two signal pulses $128_1$ and $128_2$ to which the predetermined delay time is given and the two signal pulses are output. The delay time is set according to a signal repetition rate (bit/s) of the signal pulse 128, and the delay time which is given to each of the split signal pulses is different from each other by the time corresponding to one bit.

Using the beam splitting prisms 130 and 132, the plurality of beams in which the parallelism is high and the delay time is precisely controlled can be easily obtained with very simple configuration. Since at least one beam is output in coaxial relation with the incident light beam, the alignment becomes easy to perform and the beam splitting prism can be placed into the optical path with high accuracy. Accordingly, the spatial and temporal superimposition of the condensing spots of the conrtol pulse and signal pulse can be secured during condensing the light beams at multiple points, and the all-optical switching device can be driven with high accuracy.

In an example shown in FIG. 16A, since a conrtol pulse $126_1$ is outputted while the conrtol pulse $126_1$ is coaxial with a conrtol pulse 126 incident to a beam splitting prism 130 and a signal pulse $128_2$ is outputted while the signal pulse $128_2$ is coaxial with a signal pulse 128 incident to a beam splitting prism 132, the beam splitting prism can be accurately arranged in the optical path so that the conrtol pulse $126_1$ reflected from a half mirror 134 and the signal pulse $128_2$ passed through the half mirror 134 are incident to the same position of an optical switch 136.

The optical switch 136 selects only time division component synchronized with the conrtol pulse from each split signal pulse and transmits only the selected signal pulse by the nonlinear change in the transmittance induced by the conrtol pulses $126_1$ and $126_2$. That is to say, only a signal pulse $128_1$(2) and a signal pulse $128_2$(1) incident at the same timing as the conrtol pulses $126_1$ and $126_2$ (hereinafter referred to as "signal pulse synchronized with conrtol pulse") among signal pulses $128_1$(1), $128_1$(2), $128_2$(1), and $128_2$(2) incident to the optical switch 136 are selected and transmitted by the optical switch 136.

A quantum well of semiconductor, absorption saturation of a dye thin film, and the like can be utilized as the optical switch 136. Only the desired output pulse can be transmitted by the change in absorbance caused by the irradiation with the conrtol pulse. Further, the configuration in which the change in the transmittance is emphasized by utilizing interference of the reflected light beams between the both surfaces of a switching thin film or the configuration in which the switching is performed by the change in the refractive index in a transparent wavelength range may be used (see JP-A No. 11-15031). The optical switch 136 is made by forming the thin film of a nonlinear optical material on a transparent substrate.

For example, a dichroic mirror made by the dielectric multi-layered film can be used as the half mirror 134. However, in order to use the dichroic mirror, it is necessary that a wavelength $\lambda 1$ of the conrtol pulse is different from a wavelength $\lambda 2$ of the signal pulse and the relationship between the wavelengths $\lambda 1$ and $\lambda 2$ is known. For example, the wavelength $\lambda 1$ of the conrtol pulse can be set to 850 nm and the wavelength: $\lambda 2$ of the signal pulse can be set to 900 nm.

In the above-mentioned all-optical switching device, bit signals at different time can be continuously read at each point of the optical switch in such a manner that the time difference added to the signal pulse corresponds to a bit rate (signal period) of the signal pulse. By using the beam splitting prism of the invention, the signal having a string of continuous 2 to 64 bits can be switched with the disk type optical switch. Needless to say, the signal having a further longer bit length can be also continuously read by one conrtol pulse in such a manner that the split number is increased by using the combined prism or the like.

Figure 16B:
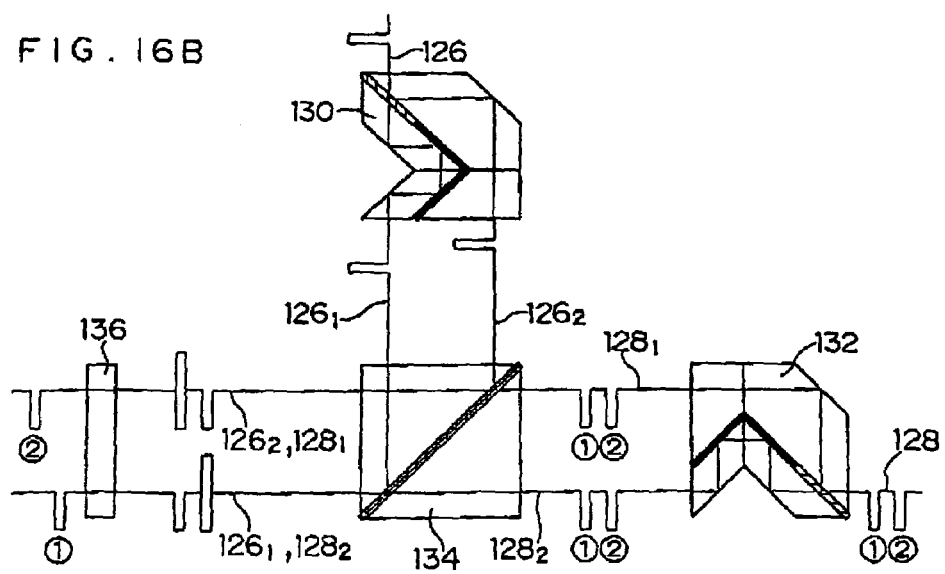

The case in which the delay time is given to the signal pulse has been shown in FIG. 16A, however, the delay time may be also given to the conrtol pulse to be input in the optical switch as shown in FIG. 16B. Though the drawing is omitted, the signal pulse may be shifted from the conrtol pulse by, e.g. ½ bit by giving the delay time to both the signal pulse and the conrtol pulse. Whether the delay time adding type prism is used to the signal pulse or the conrtol pulse is actually equal from a principle point of view. However, the readout signal is simultaneously output when the delay time adding type prism is used on the signal pulse side, and the readout signal is continuously output when the delay time adding type prism is used on the conrtol pulse side.

The description about the polarization characteristics of the beam splitting prism has been omitted. However, for the beam splitting prism having the polarization characteristics, it is necessary to assemble the beam splitting prism under the condition precisely suitable for the polarization characteristics. For example, in the case where the two beam splitting prisms are combined in series the polarization characteristics in coating the half mirror and total reflection mirror of the beam splitting prisms are made to be orthogonal to each other so that the coating having the polarization characteristics suitable for the polarized direction of the incident light beam should be obtained in both the prisms when both the prisms are combined. Alternatively, a wave plate whose setting angle is properly adjusted is arranged on the output side of the combined beam splitting prism and the desired polarized light is output.

The beam splitting prisms and the all-optical switching devices of the preferred embodiments of invention have been described above. However the configurations according to the embodiments are typical, and the invention includes the beam splitting prisms and the all-optical switching devices, which have a basically similar design guideline. The beam splitting prism of the invention has potential for being utilized to not only the all-optical switching device but also any spatial optical-parallel processing.

Although the example in which the half mirror is used as the lightwave splitting optical element was described in the above embodiments, the mirror type beam splitter, in which a metal thin film or a dielectric multilayered film is provided on a substrate such as a glass plate and a part of the beams is transmitted while other part of the beams is reflected, can be used as the lightwave splitting optical element. In addition to the half mirror in which the intensity of the transmitted light beam is substantially equal to the intensity of the reflected light beam, the polarization beam splitter which takes out the beams whose vibration directions of magnetic vectors are orthogonal to each other is preferably used for the mirror type polarization beam splitter. As long as the above lightwave splitting function is exerted, the diffraction grating or the holographic optical element or a liquid crystal type optical modulating element can be also used.

Although the example in which the total reflection mirror is used as the reflecting optical element was described in the above embodiments, the reflecting optical element is not limited to the total reflection mirror, and other reflecting mirror, in which a metal thin film or a dielectric multilayered film is provided on a substrate such as a glass plate and the incident lightwave is reflected, can be also used. Further, the total reflection prism and the like can be also used as the reflecting optical element.

According to the beam splitting prism of the invention, there is an advantage that the beam can be split by simpler configuration in the state in which the accuracy of the outgoing position and the parallelism are high and the optical path length is precisely controlled, and outgoing positions of outgoing beams which are split can be set freely. According to the method of manufacturing the beam splitting prism of the invention, there is the advantage that the beam splitting prism of the invention can be easily manufactured.

According to the all-optical switching device of the invention, there is the advantage that the spatial and temporal superimposition can be secured in the condensing spots of the conrtol pulse and signal pulse during condensing the light beams at multiple points.

What is claimed is:

1. A beam splitting prism, having an incident end face and an outgoing end face being orthogonal to or parallel to each other, the beam splitting prism comprising;
   a plurality of transparent mediums combined to be bonded such that a plurality of bonded surfaces are tilted at 45° relative to a propagating direction of a beam propagating inside the beam splitting prism, and including at least two pairs of bonded surfaces whose normal directions are orthogonal to each other,
   a beam splitting optical element positioned at least between one pair of the two pairs of bonded surfaces, and including a splitting surface splitting an incident beam into a transmission beam and a reflection beam reflecting a part of the incident beam at 90°, and
   a reflecting optical element positioned at least between another pair of the two pairs of bonded surfaces whose normal direction is orthogonal to that of the bonded surfaces in which the beam splitting optical element exists, and including a reflecting surface which reflects at least a part of the beam split by the beam splitting optical element at 90°,
   whereby a beam incident from the incident end face is outputted from the outgoing end face in the form of a plurality of split output beams.

2. A beam splitting prism according to claim 1, wherein another reflecting optical element is positioned between bonded surfaces whose normal direction is the same as that of the bonded surfaces in which the beam splitting optical element exists.

3. A beam splitting prism according to claim 1, wherein the plurality of split output beams have the same optical path lengths in the transparent mediums.

4. A beam splitting prism according to claim 1, wherein the plurality of split output beams have different optical path lengths in the transparent mediums.

5. A beam splitting prism according to claim 1, wherein the beam splitting prism comprises a first block and a second block,
   the first block having a structure in which a plurality of transparent mediums are laminated to be bonded such that a plurality of bonded surfaces are tilted at 45° relative to the propagating direction of the beam propagating inside the beam splitting prism, the beam splitting optical element and a first face forming a 45 ° angle relative to the bonded surfaces in which the beam splitting optical element exists, and
   the second block having a structure in which a plurality of transparent mediums are laminated to be bonded such that a plurality of bonded surfaces are tilted at 45° relative to the propagating direction of the beam propagating inside the beam splitting prism, the reflecting optical element and a second face forming a 45° angle relative to the bonded surface whose normal direction is orthogonal to that of the bonded surface in which the beam splitting optical element exists, and
   the first face and the second face are bonded.

6. A beam splitting prism according to claim 5, wherein the first block includes a surface parallel to the first face, the surface being opposite to the first face, and the second block includes a surface parallel to the second face, the surface being opposite to the second face.

7. A beam splitting prism according to claim 1, wherein the incident beam incident from the incident end face is coaxial with an optical axis of one split output beam in the plurality of split output beams outgoing from the outgoing end face.

8. A beam splitting prism according to claim 1, wherein the beam splitting optical element is a half mirror.

9. A beam splitting prism according to claim 1, wherein the beam splitting optical element is a polarized beam splitter.

10. A beam splitting prism according to claim 1, wherein the reflecting optical element is a total reflection mirror.

* * * * *